United States Patent
Tong

(10) Patent No.: US 11,860,833 B2
(45) Date of Patent: Jan. 2, 2024

(54) DATA REDISTRIBUTION METHOD, APPARATUS, AND SYSTEM

(71) Applicant: Huawei Cloud Computing Technologies Co., Ltd., Guizhou (CN)

(72) Inventor: Qiang Tong, Beijing (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 277 days.

(21) Appl. No.: 17/370,275

(22) Filed: Jul. 8, 2021

(65) Prior Publication Data
US 2021/0334252 A1    Oct. 28, 2021

Related U.S. Application Data

(63) Continuation of application No. PCT/CN2019/105357, filed on Sep. 11, 2019.

(51) Int. Cl.
G06F 16/00    (2019.01)
G06F 16/21    (2019.01)
(Continued)

(52) U.S. Cl.
CPC ........ *G06F 16/214* (2019.01); *G06F 11/1451* (2013.01); *G06F 16/128* (2019.01);
(Continued)

(58) Field of Classification Search
CPC .... G06F 16/214; G06F 16/278; G06F 16/284; G06F 16/128; G06F 16/164;
(Continued)

(56) References Cited

U.S. PATENT DOCUMENTS 7,734,598 B2 * 6/2010 Noguchi .......... G11B 20/00086
                                                          713/168
8,250,325 B2 * 8/2012 Holdman ............ G06F 16/1752
                                                          711/E12.009
(Continued)

FOREIGN PATENT DOCUMENTS

CN      103164167 A      6/2013
CN      103514212 A      1/2014
(Continued)

OTHER PUBLICATIONS

Naoyuki Miyamoto et al., "Incremental Data Migration for Multi-database Systems Based on MySQLSpider Storage Engine", 2014 IIAI 3rd International Conference on Advanced Applied Informatics, Dec. 2014, pp. 245.*
(Continued)

*Primary Examiner* — Srirama Channavajjala
(74) *Attorney, Agent, or Firm* — Conley Rose, P.C.

(57) ABSTRACT

A method includes determining a first node set and a second node set that are in a distributed database and that are separately associated with a first data table, where data in the first data table is stored in the first node set, migrating the data from the first node set to the second node set, receiving, in a process of migrating the data, a target service request for the first data table, determining, in response to the target service request, a third node set in the first node set and the second node set that is configured to respond to the target service request, and sending the target service request to a first data node in the third node set.

13 Claims, 7 Drawing Sheets

(51) Int. Cl.
- *H04L 9/08* (2006.01)
- *H04L 9/32* (2006.01)
- *G06F 16/27* (2019.01)
- *G06F 16/11* (2019.01)
- *G06F 16/2453* (2019.01)
- *G06F 16/22* (2019.01)
- *G06F 16/16* (2019.01)
- *G06F 11/14* (2006.01)

(52) U.S. Cl.
CPC ........ *G06F 16/164* (2019.01); *G06F 16/2272* (2019.01); *G06F 16/24544* (2019.01); *G06F 16/278* (2019.01); *H04L 9/088* (2013.01); *H04L 9/3236* (2013.01)

(58) Field of Classification Search
CPC .. G06F 16/1734; G06F 16/23; G06F 16/2471; G06F 16/325; G06F 16/735; G06F 16/902; G06F 16/2272; G06F 16/24544; G06F 16/182; G06F 16/2365; G06F 16/1752; G06F 3/064; G06F 11/1451
See application file for complete search history.

(56) References Cited

U.S. PATENT DOCUMENTS

| | | | |
|---|---|---|---|
| 9,805,071 B1 | 10/2017 | Ellis et al. | |
| 10,019,321 B1* | 7/2018 | Aron | G06F 11/1451 |
| 10,884,869 B2* | 1/2021 | Shaull | G06F 11/1458 |
| 11,042,330 B2* | 6/2021 | Marripudi | G06F 3/064 |
| 11,243,922 B2* | 2/2022 | Xu | G06F 16/214 |
| 2010/0235606 A1* | 9/2010 | Oreland | G06F 16/2272 |
| | | | 711/E12.002 |
| 2014/0173035 A1 | 6/2014 | Kan et al. | |
| 2015/0006476 A1* | 1/2015 | Engelko | G06F 16/214 |
| | | | 707/609 |
| 2015/0205818 A1* | 7/2015 | Darcy | G06F 16/182 |
| | | | 707/822 |
| 2017/0212939 A1* | 7/2017 | Mukherjee | G06F 16/2477 |
| 2018/0075101 A1* | 3/2018 | Amor | G06F 16/24544 |
| 2019/0392061 A1* | 12/2019 | Terry | G06F 16/2365 |

FOREIGN PATENT DOCUMENTS

| | | |
|---|---|---|
| CN | 107066570 A | 8/2017 |
| EP | 2073505 B1 * | 4/2012 |
| EP | 3321826 A1 | 5/2018 |
| WO | WO 03021377 A2 * | 3/2003 |
| WO | WO2019246335 A1 * | 12/2019 |

OTHER PUBLICATIONS

Dan Liu et al., "A Performance Optimization Scheme for Migrating Hive Data to Neo4j Database", 2018 International Symposium on Computer, Consumer and Control (IS3C) (pp. 1-5).*

Sudipto Das et al.,"ElasTraS: An elastic, scalable, and self-managing transactional database for the cloud," ACM Transactions on Database Systems, vol. 38, Issue 1,Apr. 2013, 45 pages.

* cited by examiner

DATA REDISTRIBUTION METHOD, APPARATUS, AND SYSTEM

CROSS-REFERENCE TO RELATED APPLICATIONS

This is a continuation of International Patent Application No. PCT/CN2019/105357 filed on Sep. 11, 2019. The disclosure of the aforementioned application is hereby incorporated by reference in its entirety.

TECHNICAL FIELD

This application relates to the database field, and in particular, to a data redistribution method, apparatus, and system.

BACKGROUND

Online data redistribution refers to data redistribution implemented without interrupting a user service. Currently, this technology is applied to more databases.

In a relational database, data in one or more data tables is maintained on a plurality of nodes of the database. Generally, a temporary table is created to implement online data redistribution. For example, for a first data table in which data needs to be redistributed, a temporary table is first created for the table. Then, all data, of the first data table, that is deployed on a node corresponding to the first data table is correspondingly replicated to a node corresponding to the temporary table. After the data is replicated, data in the temporary table and the data in the first data table are exchanged (this process is referred to as data switching). After the exchange is completed, the temporary table and the data in the temporary table are deleted, to complete data redistribution.

In the foregoing data redistribution process, data consistency between a source table (namely, the first data table) and the temporary table needs to be ensured, and a data switching process also needs to be performed. Therefore, complexity of the online data redistribution is relatively high.

SUMMARY

Embodiments of this application provide a data redistribution method, apparatus, and system, to reduce complexity of online data redistribution.

According to a first aspect, a data redistribution method is provided, including: determining a first node set and a second node set that are in a distributed database and that are separately associated with a first data table, where the first node set includes a data node configured to store data in the first data table before the data in the first data table is redistributed, and the second node set includes a data node configured to store the data in the first data table since the data in the first data table is redistributed; migrating the data in the first data table from the first node set to the second node set; in a process of migrating the data in the first data table, when a target service request for the first data table is received, determining, in the first node set and the second node set, a third node set configured to respond to the target service request; and sending the target service request to a data node in the third node set, where the target service request is used by each node in the third node set to process a service based on the target service request.

According to the data redistribution method provided in this embodiment of this application, a target task may be executed without establishing a temporary table, to implement online data redistribution. In this way, inter-table data migration is not necessary and only intra-table data migration needs to be performed. This reduces complexity of the online data redistribution.

In a possible implementation, the determining, in the first node set and the second node set, a third node set configured to respond to the target service request includes: when the target service request is a data addition request, determining, in the second node set, the third node set configured to respond to the data addition request.

Newly-added data is directly written into a redistributed node, to effectively reduce the redistribution complexity and improve data migration efficiency.

For example, the determining, in the second node set, the third node set configured to respond to the data addition request includes: calculating a hash value based on a key value of newly-added data carried in the data addition request, and determining, in the second node set, a data node corresponding to the hash value. The determined data node belongs to the third node set.

A hash distribution rule is used for data distribution, to implement load balancing.

In a possible implementation, the determining, in the first node set and the second node set, a third node set configured to respond to the target service request includes: when the target service request is a data deletion request, a data modification request, or a data query request associated with the first data table, determining, in the first node set, a data node configured to respond to the target service request, and determining, in the second node set, a data node configured to respond to the target service request, where the data node determined from the first node set and the data node determined from the second node set form the third node set.

In a possible implementation, the migrating the data in the first data table from the first node set to the second node set includes: filtering to-be-migrated data from the data, in the first data table, that is stored in the first node set, where the to-be-migrated data is the data, in the first data table, that is not stored in the second node set before migration; and migrating the to-be-migrated data from the first node set to the second node set.

In some scenarios, for example, in a capacity expansion scenario, because some data may not need to be migrated, the data may be referred to as invalid migrated data. For example, the invalid migrated data may be data that is deployed at a same location on a data node before and after the migration and/or data that has been deleted before a migration action, and migration of the data occupies data resources, and affects migration efficiency. Therefore, the invalid migrated data may be filtered out, and data that actually needs to be migrated is used as the to-be-migrated data on which data migration is performed. In other words, the to-be-migrated data includes data other than the invalid migrated data in the first data table. In this way, partial migration of table data may be implemented, to reduce an amount of migrated data, reduce data resource occupation, and improve migration efficiency.

For example, the filtering to-be-migrated data from the data, in the first data table, that is stored in the first node set includes: obtaining a first mapping relationship between the data in the first data table and the data node in the first node set; obtaining a second mapping relationship between the data in the first data table and the data node in the second node set; and for target data in the first data table, when a data node that is determined based on the first mapping relationship and that is corresponding to the target data is different from a data node that is determined based on the second mapping relationship and that is corresponding to the target data, determining, on the data node that is determined based on the first mapping relationship and that is corresponding to the target data, the target data as the to-be-migrated data.

In a possible implementation, different pieces of data in the first data table are separately migrated from the first node set to the second node set through a plurality of distributed transactions that are serially executed.

The plurality of distributed transactions that are serially executed are used for the data migration. Therefore, total time consumed for migrating the first data table is not necessarily shortened, but resource consumption of each distributed transaction is low, and single migration time is short. Data of a transaction that has been successfully migrated does not need to be re-migrated. Therefore, if data migration is performed again after a migration failure, costs and resource consumption are relatively low, and an impact on another user job executed at the same time is reduced.

In a possible implementation, that different data in the first data table are separately migrated from the first node set to the second node set through a plurality of distributed transactions that are serially executed includes: when the plurality of distributed transactions are serially executed, to-be-migrated data that meets a migration condition is selected from unmigrated data, in the first data table, that is in the first node set through a currently executed distributed transaction, and the selected to-be-migrated data is migrated from the first node set to the second node set, where the selected to-be-migrated data is locked in a migration process.

The migration condition includes: an amount of to-be-migrated data that is migrated through the currently executed distributed transaction is less than or equal to a specified threshold of the amount of data, and/or migration duration of migration through the currently executed distributed transaction is less than or equal to a specified duration threshold.

In a possible implementation, when the plurality of distributed transactions are serially executed, that to-be-migrated data that meets a migration condition is selected from unmigrated data, in the first data table, that is in the first node set through a currently executed distributed transaction, and the selected to-be-migrated data is migrated from the first node set to the second node set includes: n distributed plans are separately generated for n data nodes based on the currently executed distributed transaction, where the first node set includes the n data nodes, the n data nodes are in a one-to-one correspondence with the n distributed plans, and n is a positive integer; and the n data nodes are instructed to separately execute the n distributed plans to concurrently select to-be-migrated data that meets a migration subcondition from unmigrated data, in the first data table, that is on the n data nodes, and the selected to-be-migrated data that meets the migration subcondition is sent from the n data nodes to the second node set, where the migration subcondition is determined based on the migration condition.

In a possible implementation, the method further includes: in the process of migrating the data in the first data table, if a rollback trigger event is detected, rolling back data that has been migrated through the plurality of distributed transactions.

In a possible implementation, the method further includes: in the process of migrating the data in the first data table, if a rollback trigger event is detected, rolling back data that has been migrated through the currently executed distributed transaction.

The rollback trigger event may be a fault (for example, a breakdown) of a data node associated with the first data table, a data transmission error, a network error, a received rollback instruction, or the like.

In this embodiment of this application, the distributed transactions ensure data consistency and persistence in the migration process. When there is a plurality of distributed transactions, an overall data migration process for the first data table is split into migration processes in which the plurality of distributed transactions is used. If the rollback trigger event is detected, only all operations of a currently working distributed transaction need to be rolled back. After the migration condition is met again, a new distributed transaction may be initiated to perform data migration. This reduces a data granularity and an amount of data of a rollback, an amount of repeatedly migrated data, and an impact of the rollback on the overall data migration process, avoids resource waste, and improves fault tolerance of the database.

In a possible implementation, the method further includes: setting a deletion flag for migrated data, in the first data table, that is in the first node set.

To be specific, after the migrated data is deleted, the data is recorded on a corresponding data node as a historical version. During subsequent data scanning through a distributed transaction, data of the historical version is skipped (in other words, data with the deletion flag is skipped). In this way, it can be ensured that a data query operation performed by a user on the data of the historical version is effectively executed in the data migration process.

According to a second aspect, a data redistribution apparatus is provided. The apparatus may include at least one module, and the at least one module may be configured to implement the data redistribution method according to the first aspect or various possible implementations of the first aspect.

According to a third aspect, this application provides a computing device. The computing device includes a processor and a memory. The memory stores a computer instruction. The processor executes the computer instruction stored in the memory, so that the computing device is enabled to perform the method according to the first aspect or various possible implementations of the first aspect, and the computing device is enabled to deploy the data redistribution apparatus according to the second aspect or various possible implementations of the second aspect.

According to a fourth aspect, this application provides a computer-readable storage medium. The computer-readable storage medium stores a computer instruction. The computer instruction instructs the computing device to perform the method according to the first aspect or various possible implementations of the first aspect. Alternatively, the computer instruction instructs the computing device to deploy the data redistribution apparatus according to the second aspect or various possible implementations of the second aspect.

According to a fifth aspect, this application provides a computer program product. The computer program product includes a computer instruction, and the computer instruction is stored in a computer-readable storage medium. A processor of a computing device may read the computer instruction from the computer-readable storage medium. The processor executes the computer instruction, so that the computing device is enabled to perform the method according to the first aspect or various possible implementations of the first aspect, and the computing device is enabled to deploy the data redistribution apparatus according to the second aspect or various possible implementations of the second aspect.

According to a sixth aspect, a distributed database system is provided, including a management node and a data node. The management node includes the data redistribution apparatus according to the second aspect or various possible implementations of the second aspect or the computing device according to the third aspect.

According to a seventh aspect, a chip is provided. The chip may include a programmable logic circuit and/or a program instruction. When the chip runs, the chip is configured to implement the data redistribution method according to any possible implementations of the first aspect.

DESCRIPTION OF EMBODIMENTS

To make the objectives, technical solutions, and advantages of this application clearer, the following further describes the implementations of this application in detail with reference to the accompanying drawings.

Many distributed databases (DDB) support a data redistribution technology. For example, the data redistribution technology may be applied in a scenario such as system capacity expansion, capacity reduction, or data migration. Online data redistribution refers to data redistribution without interrupting a user service.

The distributed database may include a relational database. The relational database is a database that uses a relational model to organize data, and stores the data in a form of a row and a column. Generally, a row of data is a minimum unit for data reading and writing, and is also referred to as a record. In the relational database, a series of rows and columns are referred to as a data table. A data table may be regarded as a two-dimensional table. The relational model may be simply understood as a two-dimensional table model. The relational database includes one or more data tables and relationship description information between the data tables. Each data table includes table data and table information. The table data is data, in the data table, that is deployed on a data node, namely, the data stored in the form of a row and a column. The table information is information describing the data table, for example, information describing a definition and an architecture of the data table. The table information of the data table may be stored on each data node on which the table data is deployed, or may be stored on an independent node.

In the relational database, the data is stored in a structured manner. Each field in each data table is defined according to a preset rule (in other words, a structure of the table is predefined), and then the data is stored based on the structure of the data table. In this way, the form and content of the data are already defined before the data is stored into the data table, so that reliability and stability of the entire data table are relatively high.

Figure 1:
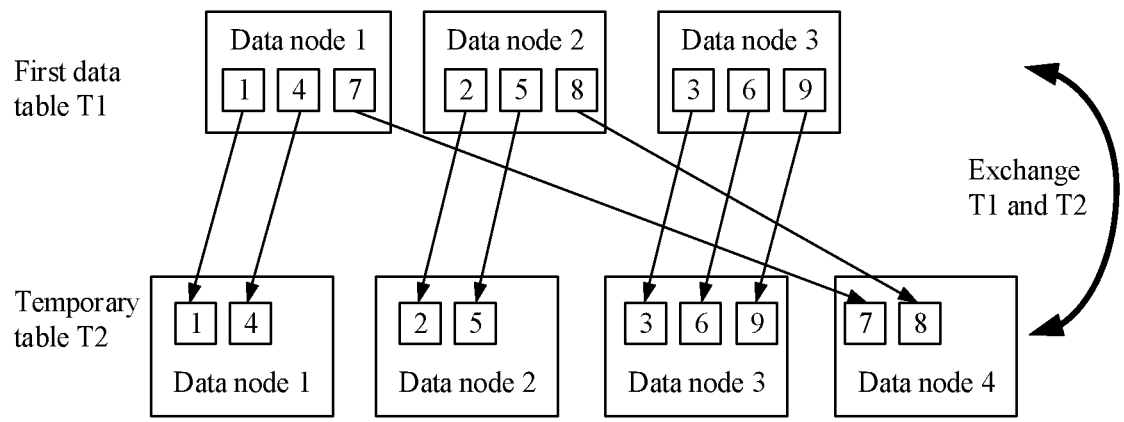
FIG. 1 is a schematic diagram of a data redistribution method according to a related technology.

In the relational database, data in the one or more data tables is deployed on a plurality of data nodes of the database. Generally, a temporary table is created to implement online data redistribution. For example, refer to FIG. 1. For a first data table T1 (which may be referred to as a source table) in which data needs to be redistributed, a temporary table T2 is first created for the table. Then, all data (data 1 to data 9), in the first data table, that is deployed on data nodes (in FIG. 1, three data nodes, nodes 1 to 3, are used as an example) corresponding to the first data table T1 is replicated to data nodes corresponding to the temporary table (in FIG. 1, four data nodes, nodes 1 to 4, are used as an example). Full data migration refers to one-off replication of all data in a data table. After a data replication process is completed, data in the temporary table T2 and the data in the first data table are exchanged. After an exchange is completed, the data in the temporary table and the data in the first data table are deleted, to complete a full data redistribution process. For example, the relational database may be a Greenplum database (gpdb) or a GaussDB.

In a process of replicating data from a node on which the source table is located to a node on which the temporary table is located (also referred to as data redistribution), if data update operations such as data addition, deletion and/or modification are performed, data in the temporary table may be inconsistent with the data in the source table. In this case, the source table is locked by an exclusive lock to temporarily disable data update, and is unlocked after a data switching process.

For example, in the gpdb, to avoid data update operations such as data addition, deletion, and/or modification in the data redistribution process, a table in which data replication is being performed is locked, and the data addition operation (also referred to as a data insertion operation), the data deletion operation, and the data modification operation are not allowed on data in the table. Only a data query operation on the data in the table is allowed.

In the GaussDB, it is assumed that data redistribution needs to be performed on the first data table. After the temporary table is established, to allow data update in the data redistribution process, for example, the data addition, deletion, and/or modification, after receiving a data update request (for example, a data addition request or a data deletion request), the GaussDB uses a specified file to record updated data, so that after a full data migration is completed, updated data in the full data migration process can be found, and incremental data migration is performed based on the updated data. The incremental data migration process refers to checking whether there are updated records (including a deleted record, a modified record, and an inserted record in the full data migration process) in the specified file. If there are updated records, the updated data is replicated again based on the updated records. An update operation may always exist. Therefore, if there is still an updated record in the specified file after several incremental data migration processes are performed, in the last incremental data migration process, the first data table should be locked (for example, by the exclusive lock) and data replication should be performed. After the data replication, an exchange process is performed between the first data table and the temporary table. Finally, the lock is released.

In the foregoing data redistribution process, data consistency between the source table and the temporary table needs to be ensured, and the data switching process also needs to be performed. Therefore, complexity of the online data redistribution is relatively high. In addition, full migration of a data table takes a long time and consumes a large quantity of resources (a plurality of resources including central processing unit (CPU) resources, memory resources, input/output (I/O) resources are greatly consumed). Another user job executed at a same time may also be affected due to insufficient resources.

Figure 2:
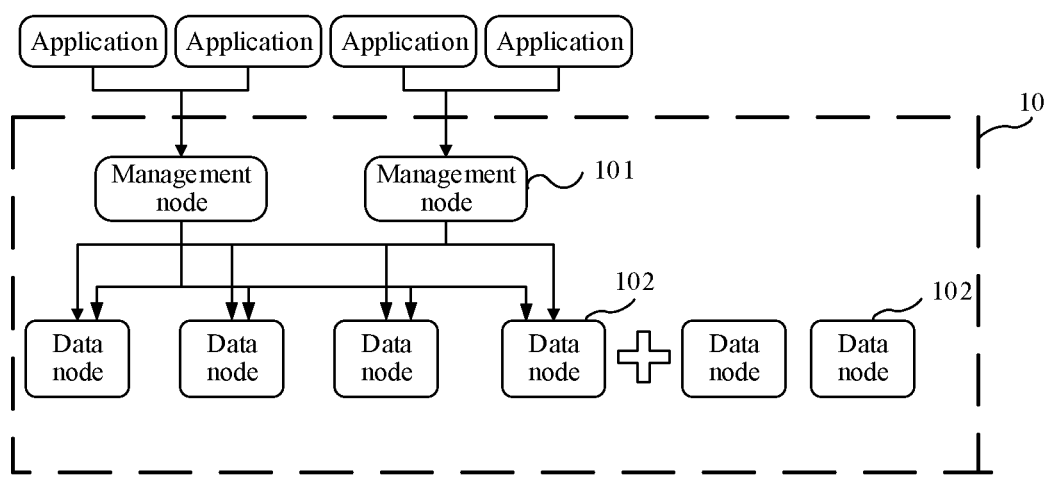
FIG. 2 is a schematic diagram of an application scenario to which a data redistribution method is applied according to an embodiment of this application.

Refer to FIG. 2. FIG. 2 is a schematic diagram of an application environment of a distributed database system (DDBS) to which a data redistribution method is applied according to an embodiment of this application. The DDBS may be deployed on one server or a server cluster including a plurality of servers. The DDBS includes a distributed database management system (DDBMS) and a DDB. In the distributed database system, an application can transparently operate the DDB through the DDBS. Data in the DDB is stored in different local databases, managed by one or more DDBMSs, run on different machines, supported by different operating systems, and are connected by different communications networks. A DDBS 10 includes: a management node (also referred to as a database engine, a coordinator data node, or a coordinator) 101 and a data node 102. The DDBMS may be deployed on the management node 101, and the DDB may be deployed on a plurality of data nodes (data node) 102. The distributed database may be established based on a share-nothing architecture. In other words, all data in the database is distributed on data nodes, and the data is not shared between the data nodes.

The management node 101 is configured to manage a corresponding data node 102, and implement an operation performed by an application 20 on the data node 102, for example, perform a data addition operation, a data deletion operation, a data modification operation, or a data query operation.

In this embodiment of this application, the management node 101 may be an independent node, or a specified data node or an elected data node in the plurality of data nodes 102. The management node 101 may be a server or a server cluster including a plurality of servers. Each data node represents a specified minimum processing unit of the DDBS. For example, each data node may be an application instance or a database execution process that manages and/or stores data. The DDBS may be deployed on the server or the server cluster including a plurality of servers. The distributed database may have a plurality of data tables, and data records of each data table are distributed to each data node according to a distribution rule defined by a user. The data distribution rule is usually hash distribution, namely, key-value distribution.

For ease of understanding, a hash distribution principle is briefly described in this embodiment of this application. The hash distribution is a data distribution method based on a hash function. The hash function may also be referred to as a hash function. The hash function is a function that obtains a value (value, also referred to as a hash value) based on a data key (key, also referred to as a key value; and also referred to as a distribution key value in a distributed system). To be specific, value=f(key), and the function f is the hash function. Table 1 is used as an example. It is assumed that the hash function is f(key)=key mod 5, and "mod" indicates a modulo operation. In other words, the hash function is a modulo operation (Module Operation) function. If keys are 1, 2, 3, 4, 5, 6, 7, 8, and 9, corresponding values are 1, 2, 3, 4, 0, 1, 2, 3, and 4, respectively.

TABLE 1

| key   | 1 | 2 | 3 | 4 | 5 | 6 | 7 | 8 | 9 |
|-------|---|---|---|---|---|---|---|---|---|
| value | 1 | 2 | 3 | 4 | 0 | 1 | 2 | 3 | 4 |

According to the preceding information, when a key is 1 or 6, a value is 1. Therefore, when the hash function is used to determine the value, different keys may correspond to a same value. This case is referred to as a hash conflict. A hash bucket algorithm is a special hash algorithm, and can resolve the hash conflict. A hash bucket is a container for placing different key linked lists (also referred to as hash tables). The hash bucket is also referred to as an f(key) set or a value set. A same hash bucket corresponds to a same value. With reference to the foregoing example, a quantity of hash buckets may be set to a value of a modulus (also referred to as a modulus), that is, 5. A plurality of values are in a one-to-one correspondence to a plurality of hash buckets. For example, a value may be used as an index or a sequence number of a hash bucket. Each hash bucket stores keys having a same value, and conflicting keys in a same hash bucket are stored in a one-way linked list. In this way, the hash conflict is resolved. When data corresponding to a key is searched for, a hash bucket of a corresponding value is indexed through the key. Then, a search is started from a node corresponding to a first address of the hash bucket. In other words, the search is based on a linked list sequence. Key values are compared until the corresponding key is found, and the corresponding data is indexed based on the found key. As shown in Table 1, when a key is 1 or 6, corresponding data is stored in a hash bucket 1; when a key is 2 or 7, corresponding data is stored in a hash bucket 2; when a key is 3 or 8, corresponding data is stored in a hash bucket 3; when a key is 4 or 9, corresponding data is stored in a hash bucket 4; and when a key is 5, corresponding data is stored in a hash bucket 0.

It should be noted that the foregoing embodiment is described merely with an example in which the hash function is the modulo function. Actually, the hash function may alternatively be a function for obtaining a remainder (in this case, the hash function is a complementation function, and a quantity of hash buckets is a value of a modulus), or another function. This is not limited in this embodiment of this application.

Figure 3:
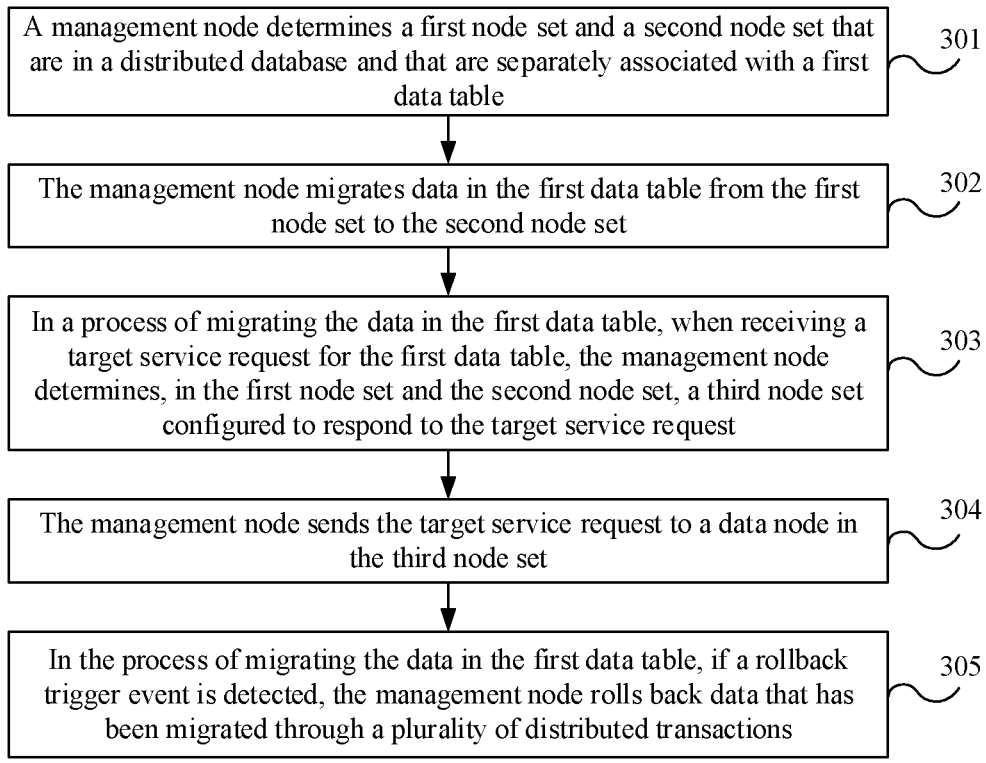
FIG. 3 is a schematic flowchart of a data redistribution method according to an embodiment of this application.

An embodiment of this application provides a data redistribution method. The method may be applied to the distributed database in the application environment shown in FIG. 2, and can reduce complexity of online data redistribution. All or part of the method may be performed by the foregoing management node. As shown in FIG. 3, in this embodiment of this application, it is assumed that a first data table is a to-be-migrated data table, namely, a data table in which data is to be redistributed. The method includes the following steps.

Step 301: The management node determines a first node set and a second node set that are in the distributed database and that are separately associated with the first data table.

Operation and maintenance personnel of the distributed database adjust a data node based on information such as a database load. When a new data node is added to the distributed database (in a capacity expansion scenario), or some data nodes need to be deleted (in a capacity reduction scenario), or storage data on some data nodes needs to be adjusted (in a data migration scenario), or an inter-group data table of a data node needs to be adjusted (in an inter-group data table adjustment scenario), the operation and maintenance personnel may input a data redistribution instruction to the management node. The management node receives the data redistribution instruction, and controls, based on the data redistribution instruction, the data node to perform data redistribution. The data redistribution instruction is a structured query language (SQL) used to indicate the data redistribution, and includes one or more SQL statements. In the inter-group data table adjustment scenario, data nodes in the distributed database are grouped into different data node groups. Each data node group includes a same quantity or different quantities of data nodes. When a user wants to migrate a table created on a data node group to another data node group, table data needs to be redistributed on the new data node group, to create this scenario.

In different data redistribution scenarios, data redistribution content is different. For example, in the capacity expansion scenario, data nodes after redistribution include all data nodes before redistribution, and the data redistribution instruction is a capacity expansion instruction. The capacity expansion instruction is used to indicate a data table (which is the first data table in this embodiment) related to a capacity expansion operation, and is further used to indicate a data node added in the capacity expansion operation. In the capacity reduction scenario, data nodes before redistribution include all data nodes after redistribution, and the data redistribution instruction is a capacity reduction instruction. The capacity reduction instruction is used to indicate a data table (which is the first data table in this embodiment) related to a capacity reduction operation, and is further used to indicate a data node reduced in the capacity reduction operation. In the data migration scenario, data nodes before and after redistribution may or may not overlap, and the data redistribution instruction is a data migration instruction. The data migration instruction is used to indicate a data table (which is the first data table in this embodiment) related to a data migration operation, and is further used to indicate a target data node migrated in the data migration operation. In the inter-group data table adjustment scenario, generally, no data node overlaps between data nodes after redistribution and data nodes before redistribution. The data redistribution instruction is a data migration instruction. The data migration instruction is used to indicate a data table (which is the first data table in this embodiment) related to a data migration operation, and is further used to indicate a target data node group migrated in the data migration operation.

It should be noted that there may be another data redistribution scenario. These are merely examples for description in this embodiment of this application, and are not limited thereto. After the data redistribution instruction triggers a data redistribution process, to effectively identify whether the first data table is currently in the data redistribution process, the management node may add a redistribution flag to the first data table. The redistribution flag is used to indicate that the first data table is in the data redistribution process. Subsequently, after receiving a service request of the user, the management node may execute a corresponding action by querying whether a redistribution flag is added to a data table related to the service request.

The management node may obtain the first node set and the second node set based on the data redistribution instruction (to be specific, by parsing the SQL statements in the data redistribution instruction). The first node set includes a data node configured to store data in the first data table before the data in the first data table is redistributed. In other words, the first node set is a set of data nodes on which the data in the first data table is currently (in other words, when the step 301 is performed, and before a step 302) deployed. The second node set includes a data node configured to store the data in the first data table since the data in the first data table is redistributed. In other words, the second node set is a set of data nodes on which the data in the first data table is deployed after subsequent data migration (in other words, after the step 302). In this embodiment of this application, both the first node set and the second node set include one or more data nodes.

The first node set may be obtained in a plurality of manners. In an optional manner, the data nodes on which the data in the first data table is currently deployed may be directly queried, to obtain the first node set. In another optional manner, a current mapping relationship between data in each data table and a data node, in a node set, on which the data in each data table is deployed may be maintained in the distributed database. Each mapping relationship may be updated in real time based on a deployment location of data in a corresponding data table. Therefore, the first node set corresponding to the first data table may be obtained by querying the mapping relationship. For example, a mapping relationship between the data in the first data table and the data node in the first node set is referred to as a first mapping relationship, and the first node set may be determined by querying the first mapping relationship. In still another optional manner, the data redistribution instruction may carry an identifier of the first node set, and the first node set is obtained based on the identifier.

The second node set may also be obtained in a plurality of manners. The second node set may be directly obtained based on the data redistribution instruction. For example, in the capacity expansion scenario, the first node set and the data node added in the capacity expansion operation are determined as data nodes included in the second node set. As shown in FIG. 2, the capacity expansion scenario is used as an example. In this case, the first node set includes four data nodes in total, and the second node set includes six data nodes in total. In the capacity reduction scenario, data nodes in the first node set other than the data node reduced by the capacity reduction operation are determined as the second node set. In the data migration scenario, the target data node migrated in the data migration operation is determined as the second node set. In the inter-group data table adjustment scenario, the target data node group migrated in the data migration operation is determined as the second node set.

It should be noted that the first node set and the second node set may alternatively be determined in another manner. These are merely examples for description in this embodiment of this application, and are not limited thereto.

Figure 4:
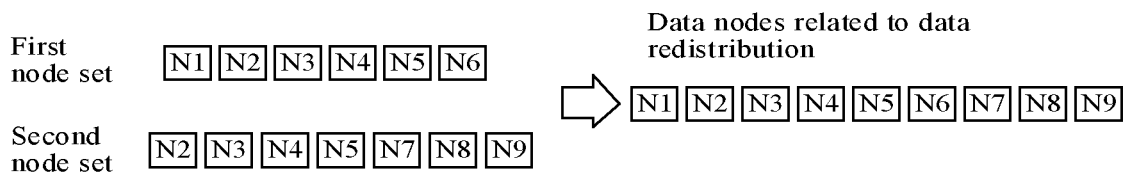
FIG. 4 is a schematic diagram of a data node to which a data redistribution method is applied according to an embodiment of this application.

As shown in FIG. 4, it is assumed that the first node set includes data nodes N1 to N6, and the second node set includes data nodes N2 to N5 and N7 to N9. In this case, data nodes related to this data redistribution include data nodes N1 to N9.

Before a data migration process of the first data table in the step 302, the data nodes related to the data redistribution may be uniformly numbered and sorted in advance, and the first mapping relationship between the data in the first data table and the data node in the first node set, and a second mapping relationship between the data in the first data table and the data node in the second node set are determined according to a hash distribution rule. The first mapping relationship and the second mapping relationship may be determined according to a principle of a minimum movement quantity (also referred to as a minimum data movement principle). If a distributed system pre-stores the first mapping relationship that is between the data in the first data table and the data node in the first node set, the mapping relationship may be directly obtained, and hash calculation is not performed again. A mapping relationship of table data distribution may be organized by obtaining the first mapping relationship and the second mapping relationship. In this way, a moving direction of the data in a subsequent data migration process can be easily found. In addition, preparation for generating a distributed plan (also referred to as a distributed execution plan) can be conveniently made in a process of migrating the data in the first data table.

In short, the foregoing process of determining the first node set and the second node set is a process of determining related data nodes before and after the data redistribution, and the process of determining the mapping relationship is a process of determining data nodes on which data is specifically distributed before and after the data redistribution.

Step 302: The management node migrates the data in the first data table from the first node set to the second node set.

In this embodiment of this application, a principle of a migration action is similar to data cutting, and is an action of moving a piece of data from one node to another node. A process of migrating the data in the first data table from the first node set to the second node set is a process of moving the data in the first data table from the first node set to the second node set. Optionally, data moved from the first node set is no longer stored in the first node set.

The data migration process of the first data table, namely, the data redistribution process, may have a plurality of implementations. In this embodiment of this application, the following several optional implementations are used as examples for description, but these are not limited.

In a first optional implementation, all data in the first data table is directly migrated from the first node set to the second node set. In other words, all the data in the first data table is used as the to-be-migrated data. In this way, a migration process is a full migration process.

In a second optional implementation, the to-be-migrated data is filtered from the data, in the first data table, that is stored in the first node set, where the to-be-migrated data is the data, in the first data table, that is not stored in the second node set before migration; and the to-be-migrated data is migrated from the first node set to the second node set.

In some scenarios, for example, in the capacity expansion scenario, because some data may not need to be migrated, the data may be referred to as invalid migrated data. For example, the invalid migrated data may be data that is deployed at a same location on a data node before and after the migration and/or data that has been deleted before a migration action, and migration of the data occupies data resources, and affects migration efficiency. Therefore, the invalid migrated data may be filtered out, and data that actually needs to be migrated is used as the to-be-migrated data. In other words, the to-be-migrated data includes data other than the invalid migrated data in the first data table. In this way, partial migration of the table data may be implemented, to reduce an amount of migrated data, reduce data resource occupation, and improve migration efficiency.

It should be noted that, only when a same data node exists in the first node set and the second node set (in other words, data nodes in the first node set and the second node set intersects), a case in which a location of data deployed on a data node does not change before and after the migration may occur. If the data nodes in the first node set and the second node set are totally different (this case may occur in the data migration scenario), generally, the case in which a location of data deployed on a data node does not change before and after the migration does not occur. In this case, all data, in the first data table, that is deployed on the data node in the first node set needs to be migrated to the data node in the second node set. In other words, the to-be-migrated data is all the data, in the first data table, that is deployed on the data node in the first node set. Therefore, in this embodiment of this application, before the to-be-migrated data is filtered from the data, in the first data table, that is stored in the first node set, whether a same data node exists in the first node set and the second node set may further be detected. When the same data node exists in the first node set and the second node set, the to-be-migrated data is filtered from the data, in the first data table, that is stored in the first node set. When the first node set and the second node set do not have the same data node, a filtering action is not executed. Because a calculation amount of a process of filtering the to-be-migrated data is larger than that of the foregoing detection process, additional filtering of the to-be-migrated data can be avoided, to reduce calculation complexity and improve data migration efficiency.

Figure 5:
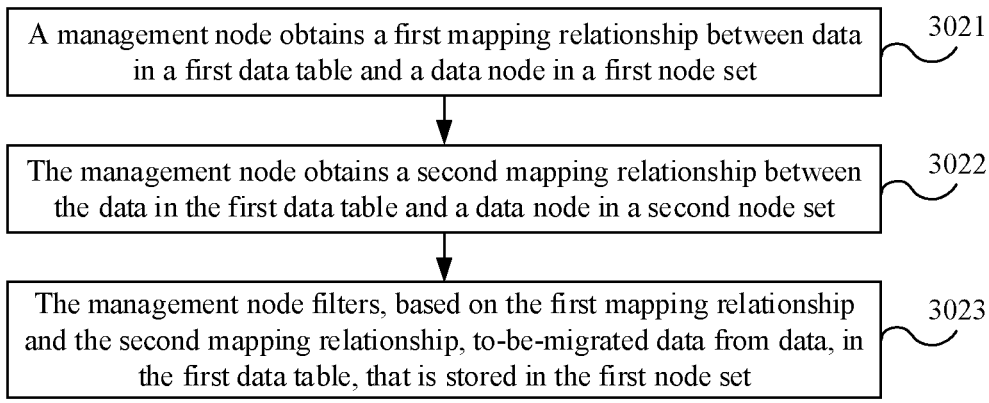
FIG. 5 is a schematic flowchart of a method for filtering to-be-migrated data according to an embodiment of this application.

For example, as shown in FIG. 5, a process of filtering the to-be-migrated data from the data, in the first data table, that is stored in the first node set may include the following steps.

Step 3021: The management node obtains the first mapping relationship between the data in the first data table and the data node in the first node set.

In the distributed database, data is distributed according to a load balancing principle. With reference to the foregoing description, to ensure even data distribution and implement load balancing, the hash distribution rule is usually used to distribute the data on each data node. Further, to avoid a hash conflict, a hash bucket algorithm may further be introduced to distribute the data. In a distributed database to which the hash bucket algorithm is introduced, data distributed on each data node is usually measured in a hash bucket, to achieve load balancing. Generally, data corresponding to one or more hash buckets may be deployed on one data node.

When the data is distributed according to the hash distribution rule, the first mapping relationship may be represented by a mapping relationship between the hash value and an identifier of the data node in the first node set.

Further, in the distributed database to which the hash bucket algorithm is applied, because in the hash bucket algorithm, hash values are in a one-to-one correspondence with hash bucket identifiers, the first mapping relationship may alternatively be represented by a mapping relationship between a hash bucket identifier and the identifier of the data node in the first node set. The identifier of the data node may include one or more characters (for example, numbers), and is used to identify the data node. The identifier of the data node may be a data node name (for example, N1 or N2) or a data node number. The hash bucket identifier may include one or more characters (for example, numbers), and is used to identify the hash bucket. The hash bucket identifier may be a value of a calculated hash value, or may be a hash bucket number, for example, 1 or 2.

Figure 6:
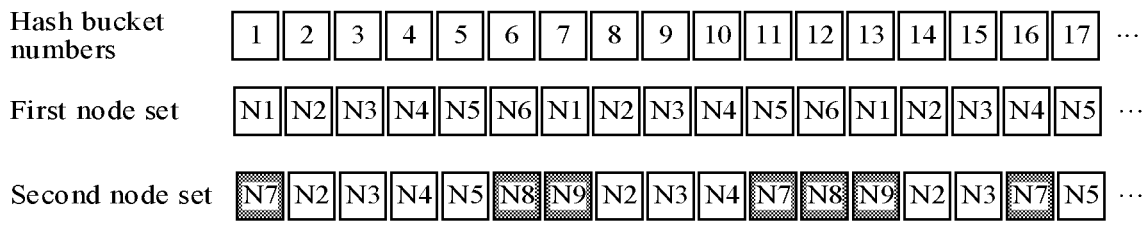
FIG. 6 is a schematic diagram of a mapping relationship according to an embodiment of this application.

The first mapping relationship may be calculated in real time. If the distributed database pre-records the first mapping relationship, the pre-recorded first mapping relationship may alternatively be directly obtained. The first mapping relationship may be represented in a manner of a relationship diagram, a relationship table, or a relationship index. For example, the first mapping relationship may be a relationship diagram shown in FIG. 6. In the relationship diagram, it is assumed that the first mapping relationship may be represented by a mapping relationship between the hash bucket number and a name of the data node in the first node set. Therefore, as shown in FIG. 6, based on the first mapping relationship, it can be learned that data whose hash bucket numbers are 1 to 6 respectively corresponds to data nodes whose data node names are N1 to N6, data whose hash bucket numbers are 7 to 12 respectively corresponds to the data nodes whose data node names are N1 to N6, and data whose hash bucket numbers are 13 to 17 respectively corresponds to data nodes whose names are N1 to N5. It can be learned that, in the first mapping relationship, a data node N1 corresponds to hash buckets whose hash bucket numbers are 1, 7, and 13; a data node N2 corresponds to hash buckets whose hash bucket numbers are 2, 8, and 14; a data node N3 corresponds to hash buckets whose hash bucket numbers are 3, 9, and 15; a data node N4 corresponds to hash buckets whose hash bucket numbers are 4, 10, and 16; a data node N5 corresponds to hash buckets whose hash bucket numbers are 5, 11, and 17; and a data node N6 corresponds to hash buckets whose hash bucket numbers are 6 and 12. In the first mapping relationship shown in FIG. 6, the data node name has a one-to-many relationship with the hash bucket number.

Step 3022: The management node obtains the second mapping relationship between the data in the first data table and the data node in the second node set.

Similar to the first mapping relationship, the second mapping relationship may be represented in a plurality of manners and in a plurality of forms. When the data is distributed according to the hash distribution rule, the second mapping relationship may be represented by a mapping relationship between the hash value and an identifier of the data node in the second node set. Further, in the distributed database to which the hash bucket algorithm is applied, the second mapping relationship may alternatively be represented by a mapping relationship between the hash bucket identifier and the identifier of the data node in the second node set. The identifier of the data node may include one or more characters (for example, numbers), and is used to identify the data node. The identifier of the data node may be a data node name (for example, N1 or N2) or a data node number. The hash bucket identifier may include one or more characters (for example, numbers), and is used to identify the hash bucket. The hash bucket identifier may be the value of the calculated hash value, or may be the hash bucket number, for example, 1 or 2. The second mapping relationship may be calculated in real time, for example, determined based on the first mapping relationship and the principle of the minimum movement quantity. If the distributed database pre-records the second mapping relationship, the pre-recorded second mapping relationship may alternatively be directly obtained. The second mapping relationship may be represented in a manner of a relationship diagram, a relationship table, or a relationship index.

For example, the second mapping relationship may be the relationship diagram shown in FIG. 6. In the relationship diagram, it is assumed that the second mapping relationship may be represented by a mapping relationship between the hash bucket number and a name of the data node in the second node set. Therefore, as shown in FIG. 6, based on the second mapping relationship, it can be learned that the data whose hash bucket numbers are 1 to 6 respectively corresponds to data nodes whose data node names are N7, N2, N3, N4, N5, and N8; the data whose hash bucket numbers are 7 to 12 respectively corresponds to data nodes whose data node names are N9, N2, N3, N4, N7, and N8; and the data whose hash bucket numbers are 13 to 17 respectively corresponds to data nodes whose names are N9, N2, N3, N7, and N5. It can be learned that, in the second mapping relationship, the data node N2 corresponds to the hash buckets whose hash bucket numbers are 2, 8, and 14; the data node N3 corresponds to the hash buckets whose hash bucket numbers are 3, 9, and 15; the data node N4 corresponds to hash buckets whose hash bucket numbers are 4 and 10; the data node N5 corresponds to hash buckets whose hash bucket numbers are 5 and 17; a data node N7 corresponds to hash buckets whose hash bucket numbers are 1, 11, and 16; a data node N8 corresponds to hash buckets whose hash bucket numbers are 6 and 12; and a data node N9 corresponds to hash buckets whose hash bucket numbers are 7 and 13. In the second mapping relationship shown in FIG. 6, the data node name has a one-to-many relationship with the hash bucket number.

It should be noted that the first mapping relationship and the second mapping relationship may be represented by a same relationship diagram, relationship table, or relationship index, or may be separately represented by respective relationship diagrams, relationship tables, or relationship indexes. In FIG. 6, an example in which the first mapping relationship and the second mapping relationship may be represented by the same relationship diagram is used for description, but this is not limited.

Step 3023: The management node filters, based on the first mapping relationship and the second mapping relationship, the to-be-migrated data from the data, in the first data table, that is stored in the first node set.

With reference to the foregoing content, it can be learned that the to-be-migrated data is data whose location deployed on the data node changes before and after the migration (namely, the data redistribution), namely, valid migrated data. The to-be-migrated data is the data, in the first data table, that is not stored in the second node set before the migration.

In an optional example, each piece of data in the first data table may be traversed, and the to-be-migrated data is filtered, by comparing the first mapping relationship with the second mapping relationship, from the data, in the first data table, that is stored in the first node set. Specifically, for target data in the first data table, when a data node that is determined based on the first mapping relationship and that is corresponding to the target data is different from a data node that is determined based on the second mapping relationship and that is corresponding to the target data, the target data is determined as the to-be-migrated data on the data node that is determined based on the first mapping relationship and that is corresponding to the target data.

FIG. 6 is used as an example. It is assumed that the hash value is the same as the hash bucket number. For target data X in the first data table, a hash value of the target data X is calculated. It is assumed that a hash value obtained through calculation is 1. In this case, the hash value of the target data X is stored in a hash bucket 1, and the target data X is the data whose hash bucket number is 1. It can be learned from the first mapping relationship that a data node corresponding to the target data X is N1. It can be learned from the second mapping relationship that a data node corresponding to the target data X is N7. Therefore, data nodes of the target data X before and after data migration are different, so that the target data X on the data node N1 is determined as the to-be-migrated data.

In another optional example, the first mapping relationship is compared with the second mapping relationship, and data that is in the two mapping relationships and that is stored on different data nodes is used as the to-be-migrated data. Specifically, the comparison process includes: for each data node in the first node set, querying the first mapping relationship to obtain a first data set corresponding to the data node; querying the second mapping relationship to obtain a second data set corresponding to the data node; and using, as to-be-migrated data corresponding to the data node, data that is in the first data set and that is different from data in the second data set. Obtained to-be-migrated data corresponding to each data node in the first node set forms final to-be-migrated data. It should be noted that, for a data node in the first node set, the data node may not exist in the second node set. If the data node does not exist in the second node set, a second data set corresponding to the data node is empty.

FIG. 6 is used as an example. For the data node N1 in the first node set, the first mapping relationship is queried to obtain that a first data set corresponding to the data node includes data whose hash bucket numbers are 1, 7, and 13; and the second mapping relationship is queried to obtain that a second data set corresponding to the data node N1 is empty. In this case, to-be-migrated data corresponding to the data node N1 is the data whose hash bucket numbers are 1, 7, and 13. For the data node N2 in the first node set, the first mapping relationship is queried to obtain that a first data set corresponding to the data node is data whose hash bucket numbers are 2, 8, and 14; and the second mapping relationship is queried to obtain that a second data set corresponding to the data node includes the data whose hash bucket numbers are 2, 8, and 14. In this case, to-be-migrated data corresponding to the data node N2 is empty. A method for obtaining to-be-migrated data on another data node is similar, and details are not described again in this embodiment of this application. Finally, to-be-migrated data corresponding to the first node set includes data whose hash bucket numbers are 1, 11, and 16 (subsequently, the data is separately migrated from the data nodes N1, N5, and N4 to the data node N7), data whose hash bucket numbers are 6 and 12 (subsequently the data is migrated from the data node N6 to the data node N8), and data whose hash bucket numbers are 7 and 13 (subsequently the data is migrated from the data node N1 to the data node N9).

In other data redistribution processes, when data is migrated from a source table to a temporary table, an exclusive lock is added to the source table to temporarily disable data update. In a gpdb, full data migration is used, so that the source table needs to be locked in an entire migration process. If a relatively large amount of data needs to be migrated, for example, dozens of giga (G) or dozens of tera (T) of data needs to be migrated, a user service may be blocked for dozens of minutes or even several hours. In a GaussDB, an entire migration process is divided into a full migration and a plurality of incremental migrations. If a relatively large amount of data is migrated, for example, dozens of G or dozens of T of data is migrated, the user service may be blocked for dozens of minutes.

However, in this embodiment of this application, although the full data migration is still used, in a scenario such as capacity expansion or capacity reduction, migration of a large amount of invalid migrated data can be reduced through the process of filtering the to-be-migrated data in the step 3023, to reduce service blocking duration and improve migration efficiency.

In an optional embodiment, the process of migrating the data in the first data table from the first node set to the second node set may be executed through one or more distributed transactions.

All transactions in the distributed database may be referred to as distributed transactions. The distributed transactions in this embodiment of this application relate to the management node and a plurality of data nodes. A distributed transaction usually includes three phases: a transaction start phase, a transaction execution phase, and a transaction commit phase. In a process of executing the distributed transaction, in the transaction start phase, the management node needs to prepare a specific statement for a subsequent transaction execution phase; and in the transaction execution phase, the management node executes one or more actions related to the distributed transaction. The plurality of actions may be concurrently executed. In this embodiment of this application, an action included in the distributed transaction may be a scanning action, or a migration action. The migration action may relate to one or more SQL statements. The action included in the distributed transaction may alternatively be generating a distributed plan and sending the distributed plan. In the transaction commit phase, a two-phase commit (2PC) protocol or a three-phase commit (3PC) protocol is followed, to maintain consistency of the transaction executed by the management node and the plurality of data nodes.

In another optional embodiment, the process of migrating the data in the first data table from the first node set to the second node set may be implemented through a plurality of distributed transactions that are serially executed. In this embodiment of this application, the management node may serially execute the plurality of distributed transactions, to control the data nodes in the first node set and the second node set to implement data migration.

Specifically, when serially executing the plurality of distributed transactions, the management node selects, from unmigrated data, in the first data table, that is in the first node set through a currently executed distributed transaction, to-be-migrated data that meets a migration condition (for a manner of determining the to-be-migrated data, refer to the steps 3021 to 3023), and migrates the selected to-be-migrated data from the first node set to the second node set. The selected to-be-migrated data is locked in a migration process. Generally, the to-be-migrated data is unlocked when a distributed transaction used to migrate the to-be-migrated data is successfully committed.

The migration condition includes: an amount of to-be-migrated data that is migrated through the currently executed distributed transaction is less than or equal to a specified threshold of the amount of data, and/or migration duration of migration through the currently executed distributed transaction is less than or equal to a specified duration threshold.

The amount of to-be-migrated data may be represented by a quantity of records. Data of one record is a row of data in the data table, and is a minimum unit for data migration. Correspondingly, the specified threshold of the amount of data may be represented by a specified quantity threshold.

The threshold of the amount of data and the specified duration threshold each may be a fixed value or a dynamically changing value. For example, before the step 302, the threshold of the amount of data may be determined based on an amount of data in the first data table and/or current load information of the distributed database; and/or the specified duration threshold may be determined based on the amount of data in the first data table and/or load information of a current resource (for example, one or more of a CPU resource, a memory resource, or an IO resource) used by the distributed database. The amount of data in the first data table is positively correlated with the threshold of the amount of data and the specified duration threshold. The current load information of the distributed database is negatively correlated with the threshold of the amount of data and the specified duration threshold. To be specific, a larger amount of data in the first data table indicates a larger threshold of the amount of data and a longer duration threshold. A larger load of the distributed database indicates a smaller threshold of the amount of data and a smaller duration threshold.

After migrating, through each currently executed distributed transaction, to-be-migrated data corresponding to each currently executed distributed transaction, the management node may delete migrated data, in the first data table, that is stored on the data node in the first node set, to subsequently distinguish, during data scanning, which data has been migrated and which data is not migrated.

It should be noted that, blocking duration of the user service is actually duration for which the data is locked. Because data migrated through each distributed transaction is different, duration for which each piece of migrated data is locked is duration of a migration process of a corresponding distributed transaction. In this embodiment of this application, the table data is migrated in batches through a plurality of transactions that are serially executed. An amount of migrated data and/or migration duration of each distributed transaction are/is limited, to avoid excessive resource consumption during execution of each distributed transaction, and reduce lock duration corresponding to each distributed transaction.

In other data redistribution processes in the gpdb, the full data migration is used, so that duration for which each piece of migrated data is locked is equal to migration duration of an entire incremental migration process. In the GaussDB, the entire migration process is divided into the full migration and the plurality of incremental migrations, and duration for which each piece of migrated data is locked is relatively short, but overall service blocking duration is still long.

However, in this embodiment of this application, the amount of migrated data and/or the migration duration of each distributed transaction are/is limited, so that duration for which each piece of migrated data is locked is far less than lock duration in the other data redistribution processes. The overall service blocking duration may be reduced to about 1 minute, usually without user awareness. Therefore, compared with other data redistribution methods, this method can effectively reduce the service blocking duration, ensure service smoothness, and enhance user experience. In addition, a lock added to the migrated data is a write lock, to avoid modification and deletion operations on the data in a process of migrating the data, but a query operation on the data can still be performed.

In this embodiment of this application, the management node may sequentially initiate the plurality of serial distributed transactions based on the determined first node set and second node set, generate one or more distributed plans when each distributed transaction is executed, and instruct the data node in the first node set and/or the data node in the second node set to execute the generated distributed plans, to implement data migration of the first data table. Each distributed plan corresponds to one or more data nodes. The distributed plan includes one or more SQL statements, and is used to indicate an action executed by a corresponding data node, an execution sequence of the action, and the like. For example, the executed action may be a scanning action, or a migration action. The distributed plan may carry the foregoing migration condition or a migration subcondition determined based on the migration condition. Optionally, each time a distributed transaction is initiated, the management node may further adjust content of the distributed plan, for example, adjust the migration condition or the migration subcondition based on current system resources. The distributed plan may be implemented by executing a transaction or a task on the corresponding data node. For example, when receiving the distributed plan, a data node may initiate a transaction (also referred to as a local transaction) or a task to execute, based on a sequence indicated in the distributed plan, an action indicated in the distributed plan.

Figure 7:
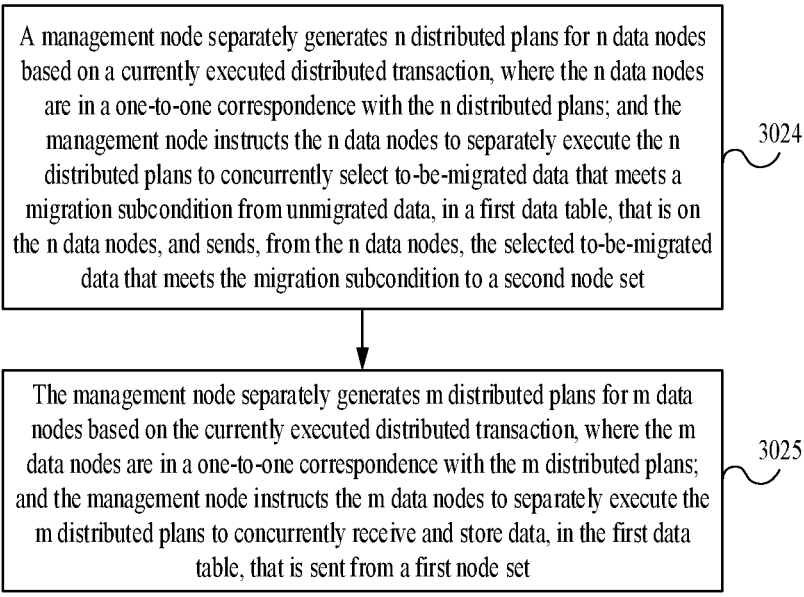
FIG. 7 is a schematic flowchart of digital migration according to an embodiment of this application.

In a first optional manner, the management node generates a plurality of distributed plans based on the currently executed distributed transaction, to instruct a plurality of data nodes to migrate data in the first data table. It is assumed that the first node set includes n data nodes, and n is a positive integer; and the second node set includes m data nodes, and m is a positive integer. As shown in FIG. 7, the migration process includes the following steps.

Step 3024: The management node separately generates n distributed plans for then data nodes based on the currently executed distributed transaction, where the n data nodes are in a one-to-one correspondence with the n distributed plans; and the management node instructs the n data nodes to separately execute the n distributed plans to concurrently select to-be-migrated data that meets the migration subcondition from unmigrated data, in the first data table, that is on the n data nodes, and sends, from the n data nodes, the selected to-be-migrated data that meets the migration subcondition to the second node set.

Specifically, for the currently executed distributed transaction, the management node sends each of the n distributed plans generated based on the distributed transaction to a corresponding data node. The corresponding data node executes the distributed plan. After each data node executes a corresponding distributed plan, the management node executes a next distributed transaction, generates n new distributed plans, and separately sends the n new distributed plans to corresponding data nodes, and so on. If all the data in the first data table has been migrated, the management node cancels the table redistribution flag, and prepares to migrate data in a next data table.

The migration subcondition is determined based on the migration condition. Optionally, the distributed plan may further carry the migration subcondition. For example, when the migration condition is that the amount of to-be-migrated data that is migrated through the currently executed distributed transaction is less than or equal to the specified threshold of the amount of data, correspondingly, the migration subcondition is that an amount of to-be-migrated data that is migrated by executing the corresponding distributed plan is less than or equal to a subthreshold of the amount of data. The quantity subthreshold is less than the specified quantity threshold. Quantity subthresholds corresponding to the n distributed plans may be equal or unequal. For example, the quantity subthresholds corresponding to the n distributed plans may be equal to one-nth of the specified quantity threshold. When the migration condition is that the migration duration of migration through the currently executed distributed transaction is less than or equal to the specified duration threshold, correspondingly, the migration subcondition is that the migration duration of migration through the currently executed distributed transaction is less than or equal to a duration subthreshold. The duration subthreshold is less than or equal to the specified duration threshold, and a maximum value of duration subthresholds corresponding to the n distributed plans is the specified duration threshold. The duration subthresholds corresponding to the n distributed plans may be equal or may be unequal. Generally, all the duration subthresholds corresponding to the n distributed plans are equal to the specified duration threshold.

For each of the n data nodes, a distributed plan obtained by each data node may be implemented by executing a transaction or a task on the data node. It is assumed that a first data node is any one of the n data nodes. An example in which the first data node executes a local transaction to implement a distributed plan is used. For example, a distributed plan generated for the first data node may include one or more SQL statements, to instruct the first data node to execute a scanning action and a migration action. The scanning action and the migration action are concurrently executed. A target data node for data migration is a second data node (namely, a data node in the second node set). In addition, the distribution plan carries the migration subcondition. Then, based on the distributed plan, the first data node may scan, through the local transaction (also called table scanning), unmigrated data, in the first data table, that is stored on the first data node, to select to-be-migrated data that meets the migration subcondition, and send the selected to-be-migrated data that meets the migration subcondition from the first data node to the second data node in the second node set.

For example, when the first optional implementation is used, and all unmigrated data in the first data table is used as the to-be-migrated data, the first data node may traverse, through the local transaction, the unmigrated data, in the first data table, that is stored on the first data node. Data obtained through traversal is the to-be-migrated data.

When the second optional implementation is used, and the to-be-migrated data is obtained through filtering the data in the first data table, the first data node traverses, through the local transaction, the unmigrated data, in the first data table, that is on the first data node, to obtain the to-be-migrated data that meets the migration subcondition through filtering. For the filtering process, refer to the step 3023.

When a distributed transaction is a distributed transaction initiated for a first time in the data redistribution process, unmigrated data obtained by scanning the n data nodes is all the data in the first data table. When a distributed transaction is a distributed transaction not initiated for the first time in the data redistribution process, the unmigrated data obtained by scanning the n data nodes is data, in the first data table, that is not migrated through a previous distributed transaction.

In the first optional implementation, the first data node may scan, through the local transaction, all records that are of the first data table and that are stored on the first data node, to obtain the unmigrated data. To be specific, scanning is from top to bottom and is started from a beginning of the data in the first data table, that is stored on the first data node. In a scanning manner provided in the first optional implementation, when the management node executes each distributed transaction, the first data node is instructed to scan all the records that are of the first data table and that are stored on the first data node, to avoid missing the to-be-migrated data.

Optionally, if the second optional implementation is used to scan the unmigrated data, the first data node may record, through the local transaction, a location at which this scanning ends. When the management node executes a next distributed transaction, the first data node is instructed to scan, based on a corresponding distributed plan, backward from a latest end location of the records that are of the first data table and that are stored on the first data node, to obtain the unmigrated data. In this way, a record that has been scanned previously on the first data node can be prevented from being scanned again.

Optionally, if the second optional implementation is used to scan the unmigrated data, to avoid that updated data is stored in a data record scanned by a data node controlled by the management node through a distributed transaction before this distributed transaction, the management node may generate n distributed plans through a distributed transaction that is last executed. Each distributed plan instructs a corresponding data node to scan, at a time, data in the first data table, that is stored on the data node, to avoid data missing. Alternatively, the n data nodes are controlled through a plurality of distributed transactions, to scan different data in the first data table at the same time.

In this embodiment of this application, when the management node executes the current distributed transaction, the step 3023 and the step 3024 may be performed in a nested manner. In other words, a specific action in the step 3023 is executed by a data node that is instructed by the management node through a distributed plan.

Step 3025: The management node separately generates m distributed plans for m data nodes based on the currently executed distributed transaction, where the m data nodes are in a one-to-one correspondence with the m distributed plans; and the management node instructs the m data nodes to separately execute the m distributed plans to concurrently receive and store data, in the first data table, that is sent from the first node set.

For each of the m data nodes, a distributed plan obtained by each data node may be implemented by executing a transaction or a task on the data node. It is assumed that the second data node is any one of the m data nodes. An example in which the second data node executes a local transaction to implement a distributed plan is used. For example, a distributed plan generated for the second data node may include one or more SQL statements, to instruct the second data node to execute a receiving action and a storage action. The receiving action and the storage action are concurrently executed. A source data node of the data is the first data node. Based on the distributed plan, the second data node may receive and store, through the local transaction, the data, in the first data table, that is sent from the first node set.

Optionally, for each data node in the first node set, the data node is configured to execute a local transaction of a distributed plan delivered by the management node. Specifically, the local transaction executed by the data node may include two threads, and the two threads are configured to separately perform the scanning action and the migration action. For example, each local transaction includes a scanning thread and a sending thread. The scanning thread is configured to scan unmigrated data, in the first data table, that is on a corresponding data node in the first node set (to be specific, when the data in the first data table is scanned, deleted data is skipped), to obtain the to-be-migrated data. For a process of determining the to-be-migrated data, refer to the step 3023. The sending thread is configured to send the to-be-migrated data to the target data node in the second node set. The two threads may be concurrently executed to improve data redistribution efficiency. For each data node in the second node set, the data node is configured to execute a local transaction of a distributed plan delivered by the management node. Specifically, the local transaction executed by the data node may include a receiving thread, configured to receive data sent by another data node, and write the received data to a local data node. Because the data node in the first node set may also receive data from another node, the local transaction executed by each data node in the first node set may further include a receiving thread. Similarly, because the data node in the second node set may also send data to another node, the local transaction executed by each data node in the second node set may also include a sending thread. Optionally, when a data node needs to initiate a sending thread and a receiving thread at the same time, to reduce occupation of the threads, the data node may initiate a sending/receiving thread by executing a local transaction (in other words, the local transaction includes the sending/receiving thread), to complete functions of the sending thread and the receiving thread, for example, receiving and sending the data.

It should be noted that, after migrating to-be-migrated data, in the first data table, that is stored on the local data node, the data node in the first node set may send a migration completion notification (also referred to as an end flag) to the target data node in the second node set to which the to-be-migrated data is migrated. For any data node in the second node set, after receiving a migration completion notification of each corresponding source data node (the source data node corresponding to the data node may be recorded in the distributed plan), the data node determines that execution of a corresponding distributed plan is completed, and stops executing the corresponding distributed plan.

A plurality of distributed plans is generated based on a distributed transaction, so that a plurality of data nodes can be instructed to concurrently execute the plurality of distributed plans, to concurrently perform data migration. This can effectively reduce execution duration of each distributed transaction, and improve efficiency of executing the distributed transaction.

Figure 8:
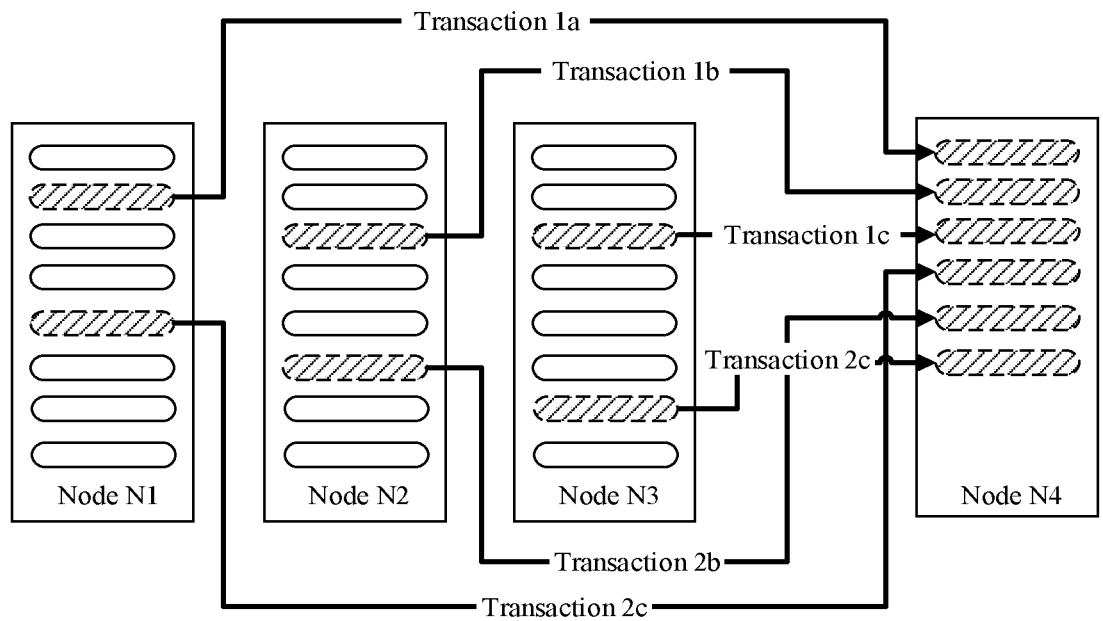
FIG. 8 is a schematic diagram of an execution scenario of data migration according to an embodiment of this application.

As shown in FIG. 8, it is assumed that the first node set includes data nodes N1 to N3, the second node set includes a data node N4, and the management node migrates the to-be-migrated data through two distributed transactions that are serially executed. It is assumed that the two distributed transactions include a first distributed transaction and a second distributed transaction. Three distributed plans generated based on the first distributed transaction are separately implemented by transactions 1a to 1c of the three data nodes in the first node set. Three distributed plans generated based on the second distributed transaction are separately implemented by transactions 2a to 2c of the three data nodes in the first node set. It is assumed that a quantity of records is used to represent an amount of migrated data and a specified threshold of an amount of data corresponding to each distributed plan is 1. In this case, each of the transactions 1a to 1c is executed, to migrate data of one record after scanning data of a plurality of unmigrated records on a corresponding data node. An example in which the management node executes the first distributed transaction is used. Each data node executes a corresponding distributed plan, so that each data node scans data on the local data node through a transaction of the data node, finds the to-be-migrated data, sends the to-be-migrated data to the target data node (the data node N4 in FIG. 8), and deletes, at the same time, migrated data that has been migrated through the transaction from the local data node. The transactions 1a to 1c are executed to concurrently execute the scanning action and the migration action until the migration condition is met or each data node meets a corresponding subcondition. Then, the management node commits the first distributed transaction, to complete migration of this batch of data. For a process of finding the to-be-migrated data, refer to a corresponding process in the step 302. For execution processes of the transactions 2a to 2c, refer to execution processes of the transactions 1a to 1c. Details are not described in this embodiment of this application. Further, a distributed plan corresponding to the data node N4 may be generated based on the first distributed transaction. The data node N4 implements the distributed plan by executing a transaction (not shown in FIG. 8), to receive data sent by the data nodes N1 to N3, and stores the received data to the data node N4.

In a second optional manner, the management node generates a distributed plan based on the currently executed distributed transaction, and instructs the data node in the first node set and the data node in the second node set to execute the distributed plan, to select the to-be-migrated data that meets the migration condition from the unmigrated data, of the first data table, in the first node set, and migrate the selected to-be-migrated data from the first node set to the second node set.

The distributed plan corresponds to a plurality of data nodes in the first node set and the second node set, and may be considered as an integrated plan of the n distributed plans and the m distributed plans in the first optional manner. The distributed plan includes one or more SQL statements, and is used to indicate an action executed by each data node in the first node set and the second node set, an execution sequence of the action, and the like. For example, the executed action may include the scanning action, the migration action, the receiving action, and/or the storage action. Optionally, the distributed plan may further carry the migration condition. After receiving the distributed plan, each data node may determine an action that needs to be executed by the data node, and may further determine, based on the migration condition, a migration sub-condition corresponding to the data node. For a process of determining the migration condition, refer to the first optional manner.

The distributed plan may be implemented by executing a transaction or a task on the data node. For a process in which each data node in the first node set and the second node set executes an action, in the distributed plan, that needs to be executed by the data node, refer to the process in which the data node executes a corresponding distributed plan in the first optional manner. Details are not described again in this embodiment of this application.

In this embodiment of this application, the distributed database stores data through a multiversion concurrency control mechanism. In the multiversion concurrency mechanism, data deleted from a data node is not physically removed from the data node, but is stored on the data node as a historical version. For example, after performing the step 3025, the management node sets a deletion flag (or controls a data node through the distributed plan to set the deletion flag) for migrated data, in the first data table, that is in the first node set. The deletion flag indicates that the migrated data is converted into data of a historical version. In this case, that the migrated data in the step 3025 is deleted is actually that the data is recorded on a corresponding data node as a historical version. Subsequently, when data scanning is performed by executing a distributed transaction, data of the historical version is skipped (in other words, data with the deletion flag is skipped). In this way, it can be ensured that a data query operation performed by the user on the data of the historical version is effectively executed in the data migration process.

It should be noted that, in the data migration process, because data that is being migrated is locked, only a data query operation can be performed on the migrated data, and a data modification operation and a data deletion operation cannot be performed. Once migration of the data is completed, a deletion flag is set for the data in the first node set, and the data becomes data of a historical version (actually, the data is not deleted from the first node set). Data of a latest version has been migrated to a new node in the second node set. The data of the historical version can only be queried. After a distributed transaction used to migrate the data is committed, a new user transaction does not query the data of the historical version. After all concurrent transactions (for example, a data query operation used to query the data of the historical version) for the data of the historical version in the first node set end, the data of the historical version is no longer accessed, and may be physically deleted. Based on a periodic data cleaning mechanism that the distributed database runs, the distributed database cleans the data of the historical version from the data in the first data table. In other words, the data is physically removed from the distributed database (the process is an expired data cleaning process).

Step 303: In the process of migrating the data in the first data table, when receiving a target service request for the first data table, the management node determines, in the first node set and the second node set, a third node set configured to respond to the target service request.

In the data migration process, a plurality of types of user services may be generated based on different requirements of the user.

In different scenarios, there is a plurality of user services, for example, a data query service, a data addition service (also referred to as a data insertion service), a data deletion service, and a data modification service, and corresponding service requests are respectively a data query request, a data addition request (also referred to as a data insertion request), a data deletion request and a data modification request. The data query request is used to request a data query operation on the data. The data addition request is used to request a data addition operation. The data deletion request is used to request a data deletion operation. The data modification request is used to request a data modification operation. The data query service is further classified, based on association between the data query service and a data table, into a data query service associated with one data table and a data query service associated with a plurality of data tables. A data query operation indicated by a data query request corresponding to the data query service associated with one data table needs to query only data in the data table. A data query operation indicated by a data query request corresponding to the data query service associated with the plurality of data tables needs to query data in the plurality of data tables. For example, the data query request is "querying information about a female employee in a company X". It is assumed that the information about the female employee in the company X is recorded in the first data table. In this case, a query operation involves only one data table, so that the data query request is a data query request corresponding to a data query service associated with the data table. For another example, the data query request is "querying information about a female employee of a customer company of the company X". It is assumed that the customer company of the company X is recorded in the second data table, and information about female employees of different customer companies is recorded in different data tables. In this case, a query operation instructs to first query the second data table to obtain an identifier of the customer company of the company X, and then query a data table corresponding to the company based on the obtained identifier, to obtain the information about the female employee of the customer company of the company X. The data query request relates to a plurality of data tables, so that the data query request is a data query request corresponding to a data query service associated with the plurality of data tables.

Figure 9:
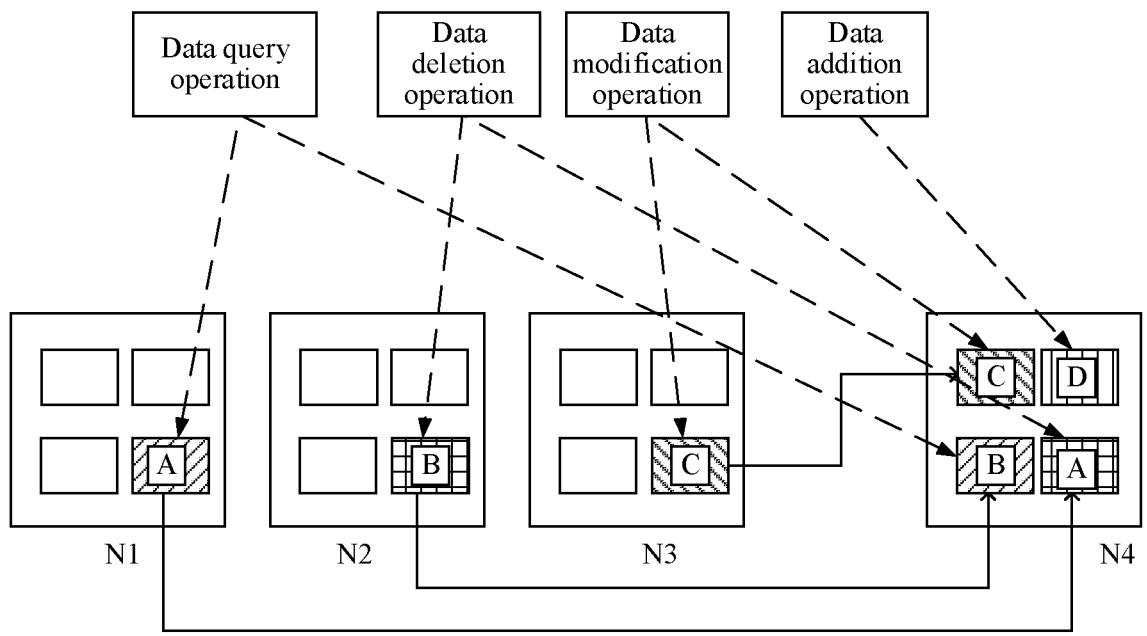
FIG. 9 is a schematic diagram of a user service scenario of data migration according to an embodiment of this application.

In this embodiment of this application, the data redistribution method may be applied to a plurality of scenarios. In this case, the target service request may be the data query request, the data addition request (also referred to as an insertion request), the data deletion request, or the data modification request. The target service request may be for data of one or more records. As shown in FIG. 9, in the data migration process, service data for a same target service may relate to a data node before data redistribution and/or a data node after the data redistribution. For example, when the data is distributed in a hash bucket manner, data in a same hash bucket is moved through a plurality of distributed transactions that is serially executed. Therefore, in a migration process, the data in the same hash bucket is distributed on two data nodes at the same time (migrated data is distributed on a data node in the second node set, and unmigrated data is distributed on a data node in the first node set). In addition, all newly-added data corresponding to the hash bucket is directly written to the data node in the second node set). Therefore, for different target services, finally determined third node sets are different. The third node set includes one or more data nodes. In this embodiment of this application, the following several implementation scenarios are used as examples to describe a process of determining the third node set.

In a first implementation scenario, when the target service request is the data addition request, the third node set configured to respond to the data addition request is determined in the second node set.

For example, a hash value is calculated based on a key value of newly-added data carried in the data addition request, and the third node set configured to respond to the data addition request is determined in the second node set. For example, in the second node set, a data node corresponding to the hash value is determined as a data node in the third node set. For example, a hash bucket corresponding to the hash value may be determined, and a data node, in the second node set, that is corresponding to the hash bucket is determined as the data node in the third node set. For example, the second mapping relationship table may be queried, and a queried data node is determined as the data node in the third node set.

As shown in FIG. 9, it is assumed that the data addition request is received. The request indicates that a data addition operation corresponds to newly-added data D. In this case, according to the hash distributed rule, it is determined that the third node set in which the newly-added data D is stored is a data node N4, and the newly added data D is stored on the data node N4.

In other data redistribution methods, due to consistency between the source table and the temporary table, if a data addition rate of the source table is greater than a data migration rate of the source table, data migration cannot be completed. If the table is forcibly locked for migration, table blocking time may be long, thereby effecting the user service. However, in this embodiment of this application, the temporary table does not need to be established, and the newly-added data is directly added to the data node (namely, the third node set) in the second node set. Therefore, in the data migration process, the newly-added data does not need to be migrated and recorded, so that the newly-added data can be quickly stored. This effectively reduces the amount of migrated data, simplifies the data migration process, improves data migration efficiency, and reduces an impact on the user service.

In a second implementation scenario, when the target service request is the data deletion request, the data modification request, or a data query request associated with the first data table, a data node configured to respond to the target service request is determined in the first node set, and a data node configured to respond to the target service request is determined in the second node set. The data node determined from the first node set and the data node determined from the second node set form the third node set.

In an optional manner, when the target service request includes the data deletion request, a data node configured to respond to the data deletion request (namely, a data node on which data that the data deletion request requests to delete is located) is queried in the first node set, and a data node configured to respond to the data deletion request is queried in the second node set. The queried data nodes are combined to form the third node set. As shown in FIG. 9, a data node on which data B that the data deletion request requests to delete is located is queried in the first node set (including data nodes N1 to N3), to obtain the data node N2. A data node on which the data B is located is queried in the second node set (including the data node N4), to obtain the data node N4. The third node set formed by the queried data nodes includes the data nodes N2 and N4.

For example, for the data deletion request, if deletion may be performed based on a key value, after a hash value is calculated based on the key value, a fourth node set is determined in the first node set based on the first mapping relationship table, and a fifth node set is determined in the second node set based on the second mapping relationship table. Deleted data may exist in both node sets. Therefore, a union set of the fourth node set and the fifth node set is determined as the third node set. In other words, the third node set includes the fourth node set and the fifth node set. The fourth node set and the fifth node set each include one or more data nodes.

In another optional manner, when the target service request includes the data modification request, a data node configured to respond to the data modification request (namely, a data node on which data that the data modification request requests to modify is located) is queried in the first node set, and a data node configured to respond to the data modification request is queried in the second node set. The queried data nodes are combined to form the third node set. As shown in FIG. 9, a data node on which data C that the data modification request requests to modify is located is queried in the first node set (including the data nodes N1 to N3), to obtain the data node N3. A data node on which the data C is located is queried in the second node set (including the data node N4), to obtain the data node N4. The third node set formed by the queried data nodes includes the data nodes N3 and N4.

For example, for the data modification request, if deletion may be performed based on the key value, after the hash value is calculated based on the key value, a sixth node set is determined in the first node set based on the first mapping relationship table, and a seventh node set is determined in the second node set based on the second mapping relationship table. Modified data may exist in both node sets. Therefore, a union set of the sixth node set and the seventh node set is determined as the third node set. The sixth node set and the seventh node set each include one or more data nodes.

In still another optional manner, when the data query request includes the data query request associated with the first data table, a data node configured to respond to the data query request (namely, a data node on which data that the data query request requests to query is located) is queried in the first node set, and a data node configured to respond to the data query request is queried in the second node set. The queried data nodes are combined to form the third node set. As shown in FIG. 9, a data node on which data A that the data modification request requests to modify is located is queried in the first node set (including the data nodes N1 to N3), to obtain the data node N1, and a data node on which the data A is located is queried in the second node set (including the data node N4), to obtain the data node N4. In this case, the third node set formed by the queried data nodes includes the data nodes N1 and N4.

For example, for the data query request, if a query may be performed based on the key value, after the hash value is calculated based on the key value, an eighth node set is determined in the first node set based on the first mapping relationship table, and a ninth node set is determined in the second node set based on the second mapping relationship table. Queried data may exist in both node sets. Therefore, a union set of the eighth node set and the ninth node set is determined as the third node set. The eighth node set and the ninth node set each include one or more data nodes.

It should be noted that the data query request associated with the first data table may be a data query request associated only with the first data table, or a data query request associated with a plurality of data tables including the first data table. When the query request is the data query request associated with the plurality of data tables including the first data table, for each data table associated with the query request, for a manner of obtaining a third node set that is corresponding to the data table and that is configured to respond to the query request, refer to a manner of obtaining the third node set corresponding to the first data table when the data query request is the data query request associated only with the first data table. Details are not described in this embodiment of this application. Subsequently, the data query request needs to be sent to the third node set corresponding to the plurality of data tables. For a sending process, refer to a subsequent step 304.

In the second implementation scenario, an operation of querying the data node is performed, to reduce a quantity of data nodes in the third node set, an amount of information subsequently exchanged with the third node set, and communication overheads.

As described above, data corresponding to the target service request may be data of one or more records. When the target service request corresponds to data of one record, because the data of the record cannot exist on two data nodes at the same time, the same record can be successfully processed only on one of the data nodes. If the third node set is not determined based on the key value, the target service request needs to be sent to all related data nodes before and after the data redistribution, because in the data migration process, all the data nodes may have a record that meets a condition requested by the target service request. It can be learned that in the second implementation scenario, the operation of querying the data node may not be performed, and a union set of the first node set and the second node set is directly determined as the third node set. For example, the target service request is the data query request. The data query request is used to request to query data in a specified data range or a specified time range in the first data table. The specified data range may be a range of data that meets a specified condition. The specified time range may be a time range that is earlier or later than a specified time point. In the data migration process of the first data table, a part of data corresponding to the data query request may be located on a data node before the data redistribution, and another part the data may be located on a data node after the data redistribution. Therefore, the data node before the data redistribution and the data node after the data redistribution usually need to be traversed, to avoid missing of queried data. In this case, the union set of the first node set and the second node set may be directly determined as the third node set. In addition, that the union set of the first node set and the second node set is directly determined as the third node set may also reduce a delay of querying the data node, and improve service execution efficiency.

Step 304: The management node sends the target service request to the data node in the third node set.

The target service request is used by each data node in the third node set to process a service based on the target service request. After receiving the target service request, each data node in the third node set processes a corresponding service. For example, it is assumed that the first data node is any data node in the third node set. In this case, the first data node performs the following process.

When receiving the data query request, the first data node detects whether the first data node stores the data that the data query request requests to query. If the first data node stores the data that the data query request requests to query, information about the data is obtained, and a data query response is sent to the management node. The data query response includes found data. If the first data node does not store the data that the data query request requests to query, a query action is stopped, or a data query response is sent to the management node. The data query response indicates that the requested data is not found.

When receiving the data addition request, the first data node directly adds the newly-added data to the first data node. Optionally, the first data node may send an addition success response to the management node.

When receiving the data modification request, the first data node detects whether the first data node stores the data that the data modification request requests to modify. If the first data node stores the data that the data modification request requests to modify, the data is modified based on the data modification request. Optionally, a data modification response is sent to the management node. The data modification response includes modified data or indicates successful modification. If the first data node does not store the data that the data modification request requests to modify, a modification action is stopped, or a data modification response is sent to the management node. The data modification response indicates that the requested data does not exist.

When receiving the data deletion request, the first data node detects whether the first data node stores the data that the data deletion request requests to delete. If the first data node stores the data that the data deletion request requests to delete, the data is deleted based on the data deletion request. Optionally, a data deletion response is sent to the management node. The data deletion response indicates successful deletion. If the first data node does not store the data that the data deletion request requests to delete, a deletion action is stopped, or a data deletion response is sent to the management node. The data deletion response indicates that the requested data does not exist.

As described above, in the data redistribution process in this embodiment of this application, after the migration, data is no longer stored on a data node on which the data is stored before the migration. Therefore, it is ensured that data of a same record is stored on only one data node in the distributed database, but not on two data nodes. In this way, it is ensured that there is no conflict response to the target service request.

Step 305: In the process of migrating the data in the first data table, if a rollback trigger event is detected, the management node rolls back data that has been migrated through the plurality of distributed transactions.

The rollback trigger event may be that a data node that is associated with the first data table and that is in the second node set is faulty (for example, breaks down), or a data transmission error occurs in the data node that is associated with the first data table and that is in the second node set, or a network error occurs in the data node that is associated with the first data table and that is in the second node set, or the data node that is associated with the first data table and that is in the second node set receives a rollback instruction, or a distributed transaction associated with the first data table fails to be committed, or the like.

In a possible implementation, after the rollback trigger event is detected in the distributed database, the data that has been migrated through the plurality of distributed transactions is rolled back, so that the distributed database may be restored to a previous state in which the distributed database can normally run. In this way, after an end condition of the rollback trigger event is met in a subsequent process, the distributed database can still normally perform an online service and another service such as data redistribution.

In a possible implementation, the step 305 may be replaced with: in the process of migrating the data in the first data table, if the rollback trigger event is detected, data that has been migrated through the currently executed distributed transaction is rolled back.

In other distributed databases, data in a data table is migrated through one distributed transaction. If a rollback trigger event is detected, all currently migrated data is rolled back. In other words, all executed actions corresponding to the distributed transaction are canceled. An amount of data of a rollback is large, and all the migrated data is invalid. After a migration condition is met again, the data needs to be migrated again. Therefore, data is migrated repeatedly, so that resources are wasted, and fault tolerance of the database is poor.

However, in this embodiment of this application, the distributed transactions ensure data consistency and persistence in the migration process. When there is a plurality of distributed transactions, an overall data migration process is split into migration processes in which the plurality of distributed transactions is serially executed. If the rollback trigger event is detected, only all operations corresponding to a currently executed distributed transaction need to be rolled back. After the migration condition is met again, a new distributed transaction may be initiated to perform data migration. This reduces a data granularity and the amount of data of a rollback, an amount of repeatedly migrated data, and an impact of the rollback on the overall data migration process, avoids resource waste, and improves fault tolerance of the database.

It should be noted that, in the process of migrating the data in the first data table, in addition to data manipulation language (DML) services such as the data query service and the data addition service, another type of user service may further be generated, for example, a data definition language (DDL) service. The DDL service includes services such as creating table information, modifying the table information, and deleting the table information. An operation object requested by the DDL service is the table information, namely, a definition and an architecture of a table.

In other data redistribution methods, data consistency between the source table and the temporary table needs to be ensured. Therefore, the DDL service is not allowed in the data migration process.

However, in this embodiment of this application, no temporary table needs to be established, and the data migration process is in the data table instead of between the source table and the temporary table. Therefore, the DDL service is supported in the data migration process. For example, modification of table metainformation is supported, and modification of a table name, and addition or deletion of a field in the data table are allowed.

It should be noted that the foregoing embodiment is described based on an example in which data in one data table needs to be redistributed. In an actual implementation of this embodiment of this application, the data redistribution process may be performed on a plurality of data tables at the same time, to improve data redistribution efficiency and increase concurrency.

In conclusion, according to the data redistribution method provided in this embodiment of this application, a target task may be executed without establishing the temporary table, to implement online data redistribution. In this way, inter-table data migration is not necessary and only intra-table data migration needs to be performed. This reduces complexity of the online data redistribution.

In addition, because the data is migrated through the plurality of distributed transactions that are serially executed, a single migration takes shorter time, consumes less resources, and reduces an impact on another user job executed at the same time.

Further, because the newly-added data is directly written into the data node after the data redistribution, the amount of migrated data is effectively reduced, thereby reducing resource consumption and reducing the impact on another user job executed at the same time.

For example, FIG. 6 is used as an example. If another data redistribution method is used, all data whose hash bucket numbers are 1 to 17 needs to be migrated from the first node set to the second node set. However, in this embodiment of this application, the data whose hash bucket number is 1 needs to be moved from the data node N1 to the data node N7; the data whose hash bucket number is 2 does not need to be moved; the data whose hash bucket number is 7 needs to be moved from the data node N1 to the data node N9, and the like. In general, only data whose hash bucket numbers are 1, 6, 7, 11, 12, 13, and 16 needs to be migrated (in FIG. 6, data nodes N7, N8, and N9, in the second node set, that need to receive the migrated data are represented by shadows). This effectively reduces the amount of migrated data.

In this embodiment of this application, in a scenario in which there is a concurrent user job, the data migration is implemented through the intra-table data migration and a distributed multiversion concurrency control technology. Data increment caused by insertion and deletion operations of the concurrent job does not need to be considered. Data can be migrated in batches based on an amount of data and execution time, to ensure that system resource consumption caused by the data redistribution is controllable. This can effectively control resource consumption and lock conflict impact of the migration and greatly reduce an impact on the user job. Online capacity expansion of the distributed database is implemented through the embodiments of this application. This can avoid long-time service blocking caused by shut-down capacity expansion, so that an online job is slightly affected. Even when a data node and a network are faulty, a redistribution operation can be easily restored, so that the data migration is slightly affected.

Figure 10:
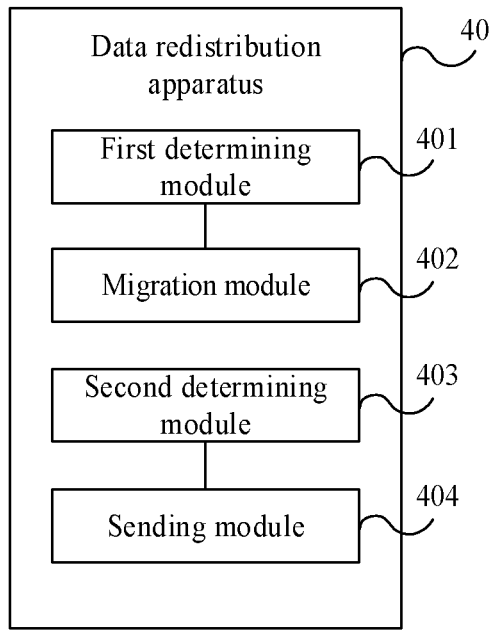
FIG. 10 is a block diagram of a data redistribution apparatus according to an embodiment of this application.

An embodiment of this application provides a data redistribution apparatus 40. The data redistribution apparatus 40 may be deployed on a management node. As shown in FIG. 10, the data redistribution apparatus 40 includes: a first determining module 401, configured to perform the step 301; a migration module 402, configured to perform the step 302; a second determining module 403, configured to perform the step 303; and a sending module 404, configured to perform the step 304.

In conclusion, according to the data redistribution apparatus provided in this embodiment of this application, a target task may be executed without establishing a temporary table, to implement online data redistribution. In this way, inter-table data migration is not necessary and only intra-table data migration needs to be performed. This reduces complexity of the online data redistribution.

Figure 11:
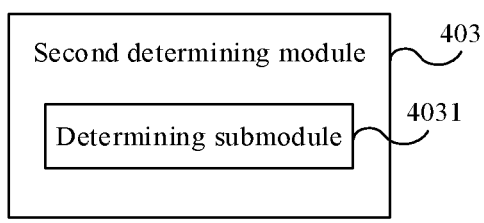
FIG. 11 is a block diagram of a second determining module according to an embodiment of this application.

Optionally, as shown in FIG. 11, the second determining module 403 includes: a determining submodule 4031, configured to: when the target service request is a data addition request, determine, in the second node set, the third node set configured to respond to the data addition request.

Optionally, the determining submodule 4031 is configured to: calculate a hash value based on a key value of newly-added data carried in the data addition request; and determine, in the second node set, a data node corresponding to the hash value, where the determined data node belongs to the third node set.

Optionally, the second determining module 403 is configured to: when the target service request is a data deletion request, a data modification request, or a data query request associated with the first data table, determine, in the first node set, a data node configured to respond to the target service request, and determine, in the second node set, a data node configured to respond to the target service request, where the data node determined from the first node set and the data node determined from the second node set form the third node set.

Figure 12:
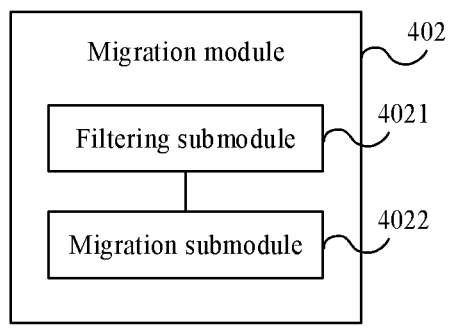
FIG. 12 is a block diagram of a migration module according to an embodiment of this application.

Optionally, as shown in FIG. 12, the migration module 402 includes: a filtering submodule 4021, configured to filter to-be-migrated data from the data, in the first data table, that is stored in the first node set, where the to-be-migrated data is the data, in the first data table, that is not stored in the second node set before migration; and a migration submodule 4022, configured to migrate the to-be-migrated data from the first node set to the second node set.

Optionally, the filtering submodule 4021 is configured to: obtain a first mapping relationship between the data in the first data table and the data node in the first node set; obtain a second mapping relationship between the data in the first data table and the data node in the second node set; and for target data in the first data table, when a data node that is determined based on the first mapping relationship and that is corresponding to the target data is different from a data node that is determined based on the second mapping relationship and that is corresponding to the target data, determine, on the data node that is determined based on the first mapping relationship and that is corresponding to the target data, the target data as the to-be-migrated data.

Optionally, the migration submodule 4022 is configured to: separately migrate different data in the first data table from the first node set to the second node set through a plurality of distributed transactions that are serially executed.

Optionally, the migration submodule 4022 is configured to: when the plurality of distributed transactions are serially executed, select, from unmigrated data, in the first data table, that is in the first node set through a currently executed distributed transaction, to-be-migrated data that meets a migration condition, and migrate the selected to-be-migrated data from the first node set to the second node set, where the selected to-be-migrated data is locked in a migration process.

The migration condition includes: an amount of to-be-migrated data that is migrated through the currently executed distributed transaction is less than or equal to a specified threshold of the amount of data, and/or migration duration of migration through the currently executed distributed transaction is less than or equal to a specified duration threshold.

Optionally, the migration submodule 4022 is configured to: separately generate n distributed plans for n data nodes based on the currently executed distributed transaction, where the first node set includes the n data nodes, the n data nodes are in a one-to-one correspondence with the n distributed plans, and n is a positive integer; and instruct the n data nodes to separately execute the n distributed plans to concurrently select to-be-migrated data that meets a migration subcondition from unmigrated data, in the first data table, that is on the n data nodes, and send, from the n data nodes, the selected to-be-migrated data that meets the migration subcondition to the second node set, where the migration subcondition is determined based on the migration condition.

Figure 13:
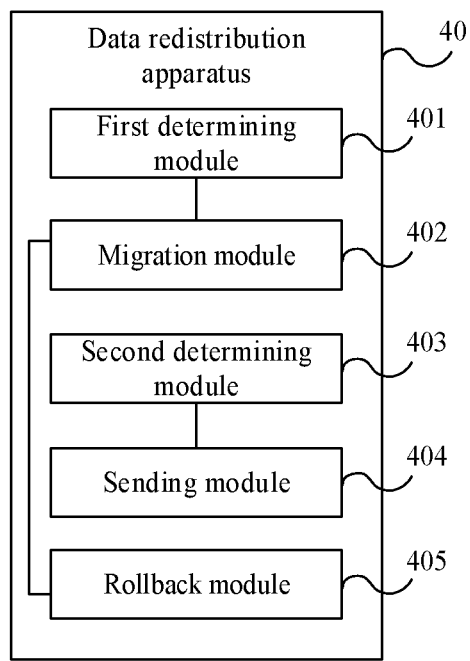
FIG. 13 is a block diagram of another data redistribution apparatus according to an embodiment of this application.

Optionally, as shown in FIG. 13, the apparatus 40 further includes: a rollback module 405, configured to: in a process of migrating the data in the first data table, if it is detected that the distributed database reaches a rollback trigger event, roll back data migrated through a currently working distributed transaction; or a rollback module 405, configured to: in a process of migrating the data in the first data table, if a rollback trigger event is detected, roll back data that has been migrated through the currently executed distributed transaction.

Figure 14:
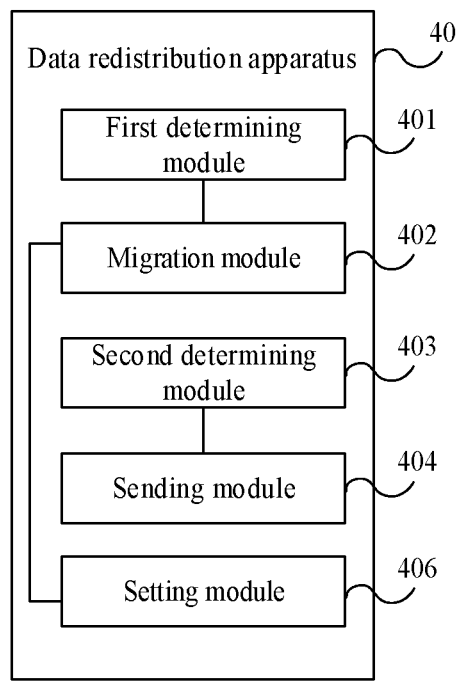
FIG. 14 is a block diagram of still another data redistribution apparatus according to an embodiment of this application.

Optionally, as shown in FIG. 14, the apparatus 40 further includes: a setting module 406, configured to set a deletion flag for migrated data, in the first data table, that is in the first node set.

Figure 15:
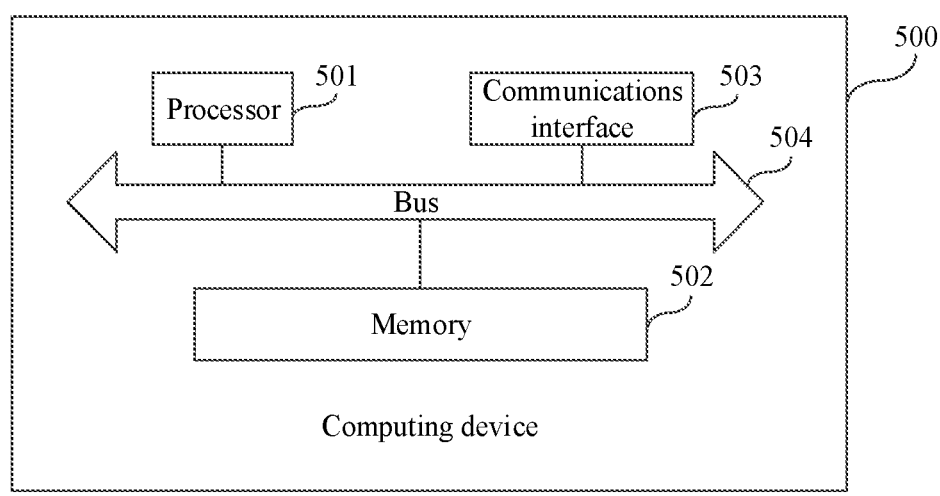
FIG. 15 is a schematic diagram of a structure of a computing device according to an embodiment of this application.

Optionally, FIG. 15 is a schematic diagram of a possible basic hardware architecture of the computing device in this application.

Refer to FIG. 15. A computing device 500 includes a processor 501, a memory 502, a communications interface 503, and a bus 504.

In the computing device 500, there may be one or more processors 501. FIG. 15 shows only one of the processors 501. Optionally, the processor 501 may be a central processing unit (CPU). If the computing device 500 includes a plurality of processors 501, the plurality of processors 501 may be of a same type or different types. Optionally, the plurality of processors 501 of the computing device 500 may be integrated into a multi-core processor.

The memory 502 stores a computer instruction and data. The memory 502 may store a computer instruction and data that are required for implementing the data redistribution method provided in this application. For example, the memory 502 stores an instruction used to implement the steps of the data redistribution method. The memory 502 may be any one or any combination of the following storage media: a nonvolatile memory (for example, a read-only memory (ROM), a solid-state drive (SSD), a hard disk drive (HDD), or an optical disc) and a volatile memory.

The communications interface 503 may be any one or any combination of the following components with a network access function, such as a network interface (for example, an Ethernet interface) and a wireless network interface card.

The communications interface 503 is configured to perform data communication between the computing device 500 and another computing device or terminal.

The processor 501, the memory 502, and the communications interface 503 may be connected through the bus 504. In this way, through the bus 504, the processor 501 may access the memory 502, and may further exchange data with another computing device or terminal through the communications interface 503.

In this application, the computing device 500 executes the computer instruction in the memory 502, so that the computing device 500 is enabled to implement the data redistribution method provided in this application, or the computing device 500 is enabled to deploy a data redistribution apparatus.

In an example embodiment, a non-transitory computer-readable storage medium including an instruction is further provided, for example, a memory including an instruction. The instruction may be executed by a processor of a server to complete the emotion picture recommendation method shown in the embodiments of the present application. For example, the non-transitory computer-readable storage medium may be a ROM, a random access memory (RAM), a compact disc read-only memory (CD-ROM), a magnetic tape, a floppy disk, an optical data storage device, or the like.

An embodiment of this application provides a distributed database system, including a management node and a data node. The management node includes the data redistribution apparatus 40 or the computing device 500.

All or some of the foregoing embodiments may be implemented through software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedure or functions according to the embodiments of the present application are all or partially generated. The computer may be a general-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

The foregoing descriptions are merely optional embodiments of this application, but are not intended to limit this application. Any modification, equivalent replacement, or improvement made without departing from the spirit and principle of this application should fall within the protection scope of this application.

In this application, the terms "first" and "second" are merely intended for description, and shall not be understood as an indication or implication of relative importance. The term "a plurality of" means two or more, unless otherwise expressly limited. A refers to B, which means that A is the same as B or A is a simple variant of B.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of this application, but are not intended to limit this application. Any modification, equivalent replacement, or improvement made without departing from the spirit and principle of this application should fall within the protection scope of this application.

What is claimed is:

1. A method, comprising:
    storing first data associated with a first data table in a first node set in a distributed database;
    filtering, before migration, the first data in the first node set to obtain second data that is associated with the first data table and that is not stored in a second node set in the distributed;
    migrating the second data that is associated with the first data table from the first node set to the second node set in the distributed database by:
        selecting, from unmigrated data in the first data table that corresponds to a currently executed distributed transaction, third data that meets a migration condition; and
        migrating the third data from the first node set to the second node set, wherein the third data is locked in a migration process, and wherein the migration condition comprises either an amount of the third data that is migrated through the currently executed distributed transaction is less than or equal to a specified threshold of the amount of the third data or a migration duration of migration through the currently executed distributed transaction is less than or equal to a specified duration threshold;
    receiving, in a process of migrating the second data, a target service request for the first data table;
    obtaining, in response to the target service request, a third node set that is configured to respond to the target service request, wherein the third node set comprises at least a first portion of the first data in the first node set and at least a second portion of the second data in the second node set, and wherein the third node set comprises a first data node; and
    sending the target service request to the first data node in the third node set to instruct the first data node to respond to the target service request.

2. The method of claim 1, wherein the target service request is a data addition request, and wherein the third node set is configured to respond to the data addition request.

3. The method of claim 2, further comprising:
    calculating a hash value based on a key value of newly-added data carried in the data addition request; and
    obtaining, in the second node set, a second data node corresponding to the hash value,
    wherein the second data node belongs to the third node set.

4. The method of claim 1, wherein the target service request is a data deletion request, a data modification request, or a data query request associated with the first data table, wherein obtaining the third node set comprises:
    obtaining, in the first node set, a second data node configured to respond to the target service request; and
    obtaining, in the second node set, a third data node configured to respond to the target service request, and wherein the second data node and the third data node form the third node set.

5. The method of claim 1, further comprising:
    obtaining a first mapping relationship between the first data and a second data node in the first node set;
    obtaining a second mapping relationship between the second data and a third data node in the second node set; and
    obtaining target data on the second data node as the second data when the second data node and the third data node are different.

6. The method of claim 1, further comprising rolling back data that has been migrated through the currently executed distributed transaction when a rollback trigger event is detected.

7. The method of claim 1, further comprising setting a deletion flag for migrated data in the first node set in the first data table.

8. An apparatus, comprising:
    a memory configured to store instructions; and
    one or more processors coupled to the memory and configured to execute the instructions to cause the apparatus to be configured to:
        store first data associated with a first data table in a first node set in a distributed database;
        filter, before migration, the first data in the first node set to obtain second data that is associated with the first data table and that is not stored in a second node set in the distributed database;
        migrate the second data that is associated with the first data table from the first node set to the second node set in the distributed database by:
            selecting, from unmigrated data in the first data table that corresponds to a currently executed distributed transaction, third data that meets a migration condition; and migrating the third data from the first node set to the second node set, wherein the third data is locked in a migration process, and wherein the migration condition comprises either an amount of the third data that is migrated through the currently executed distributed transaction is less than or equal to a specified threshold of the amount of the third data or a migration duration of migration through the currently executed distributed transaction is less than or equal to a specified duration threshold;

receive, in a process of migrating the second data, a target service request for the first data table;

obtain, in response to the target service request, a third node set that is configured to respond to the target service request, wherein the third node set comprises at least a first portion of the first data in the first node set and at least a second portion of the second data in the second node set, and wherein the third node set comprises a first data node; and send the target service request to the first data node in the third node set to instruct the first data node to respond to the target service request.

9. The apparatus of claim 8, wherein the target service request is a data addition request, and wherein the third node set is configured to respond to the data addition request.

10. The apparatus of claim 9, wherein the one or more processors are further configured to execute the instructions to cause the apparatus to be configured to:

calculate a hash value based on a key value of newly-added data carried in the data addition request; and obtain, in the second node set, a second data node corresponding to the hash value, wherein the second data node belongs to the third node set.

11. The apparatus of claim 8, wherein the target service request is a data deletion request, a data modification request, or a data query request associated with the first data table, wherein the one or more processors are further configured to execute the instructions to cause the apparatus to be configured to:

obtain, in the first node set, a second data node configured to respond to the target service request; and obtain, in the second node set, a third data node configured to respond to the target service request, and wherein the second data node and the third data node form the third node set.

12. The apparatus of claim 8, wherein the one or more processors are further configured to:

obtain a first mapping relationship between the first data and a second data node in the first node set;

obtain a second mapping relationship between the second data and a third data node in the second node set; and obtain target data on the second data node as the second data when the second data node and the third data node are different.

13. A computer program product comprising instructions stored on a non-transitory computer-readable medium that, when executed by one or more processors, cause an apparatus to:

store first data associated with a first data table in a first node set in a distributed database;

filter, before migration, the first data in the first node set to obtain second data that is associated with the first data table and that is not stored in a second node set in the distributed database;

migrate the second data that is associated with the first data table from the first node set to the second node set in the distributed database by:

selecting, from unmigrated data in the first data table that corresponds to a currently executed distributed transaction, third data that meets a migration condition; and migrating the third data from the first node set to the second node set, wherein the third data is locked in a migration process, and wherein the migration condition comprises either an amount of the third data that is migrated through the currently executed distributed transaction is less than or equal to a specified threshold of the amount of the third data or a migration duration of migration through the currently executed distributed transaction is less than or equal to a specified duration threshold;

receive, in a process of migrating the second data, a target service request for the first data table;

obtain, in response to the target service request, a third node set that is configured to respond to the target service request, wherein the third node set comprises at least a first portion of the first data in the first node set and at least a second portion of the second data in the second node set, and wherein the third node set comprises a first data node; and send the target service request to the first data node in the third node set to instruct the first data node to respond to the target service request.

* * * * *